(12) United States Patent
De Andrade et al.

(10) Patent No.: US 11,832,294 B2
(45) Date of Patent: Nov. 28, 2023

(54) FACILITATING ASSIGNMENT OF ROOT SEQUENCE INDEXES WHILE MINIMIZING NETWORK CHANGES

(71) Applicants: AT&T Intellectual Property I, L.P., Atlanta, GA (US); Pontifícia Universidade Católica do Rio de Janeiro, Rio de Janeiro (BR)

(72) Inventors: Carlos Eduardo De Andrade, Gainesville, FL (US); Nemmara Shankaranarayanan, Bridgewater, NJ (US); Slawomir Stawiarski, Carpentersville, IL (US); Luciana de Souza Pessôa, Rio de Janeiro (BR); Mariana Alves Londe, Rio de Janeiro (BR)

(73) Assignees: AT&T INTELLECTUAL PROPERTY I, L.P., Atlanta, GA (US); PONTIFÍCIA UNIVERSIDADE CATÓLICA DO RIO DE JANEIRO, Rio de Janeiro (BR)

( * ) Notice: Subject to any disclaimer, the term of this patent is extended or adjusted under 35 U.S.C. 154(b) by 84 days.

(21) Appl. No.: 17/540,880

(22) Filed: Dec. 2, 2021

(65) Prior Publication Data
US 2023/0180284 A1 Jun. 8, 2023

(51) Int. Cl.
*H04W 4/00* (2018.01)
*H04W 74/00* (2009.01)

(52) U.S. Cl.
CPC .................... *H04W 74/002* (2013.01)

(58) Field of Classification Search
CPC .................................. H04W 74/002
See application file for complete search history.

(56) References Cited

U.S. PATENT DOCUMENTS

| 5,796,722 A | 8/1998 | Kotzin et al. |
| 6,314,301 B1 | 11/2001 | Dorenbosch et al. |

(Continued)

FOREIGN PATENT DOCUMENTS

| CA | 1338458 C | * 7/1996 | ........... H04L 12/417 |
| CN | 113273301 A | * 8/2021 | ........... H04B 7/0639 |

(Continued)

OTHER PUBLICATIONS

Andrade et al., "The Multi-Parent Biased Random-Key Genetic Algorithm with Implicit Path-Relinking and its Real-World Applications", European Journal of Operational Research, 2019, 33 pages.

(Continued)

*Primary Examiner* — Thai D Hoang
(74) *Attorney, Agent, or Firm* — Amin, Turocy & Watson, LLP

(57) ABSTRACT

Facilitating assignment of root sequence index while minimizing network changes is provided herein. Operations of a system include determining an initial assignment of root sequence indexes for a group of network equipment. The operations can also include evaluating the initial assignment for first assignments that satisfy a defined criterion and second assignments that fail to satisfy the defined criterion. Based on the defined criterion, the operations can include updating the second assignments, resulting in updated second assignments. Further, the operations can include determining a revised assignment of root sequence indexes for the group of network equipment, wherein the revised assignment comprises the first assignments and the updated second assignments.

20 Claims, 15 Drawing Sheets

(56) References Cited

U.S. PATENT DOCUMENTS

| | | | |
|---|---|---|---|
| 6,477,143 | B1 | 11/2002 | Ginossar |
| 6,826,620 | B1 | 11/2004 | Mawhinney et al. |
| 7,120,467 | B2 | 10/2006 | Umesh et al. |
| 7,813,329 | B2 | 10/2010 | Mori et al. |
| 7,941,148 | B2 | 5/2011 | Roskowski et al. |
| 8,014,362 | B2 | 9/2011 | Panico et al. |
| 8,161,182 | B1 | 4/2012 | Cheng et al. |
| 8,406,146 | B2 | 3/2013 | Quilty et al. |
| 8,737,375 | B2 | 5/2014 | Puthenpura et al. |
| 8,861,331 | B2 * | 10/2014 | Abbasi .................... H04L 45/28 370/242 |
| 8,937,934 | B2 | 1/2015 | Puthenpura et al. |
| 2003/0218974 | A1 | 11/2003 | Zuniga |
| 2006/0128394 | A1 | 6/2006 | Turina et al. |
| 2008/0039089 | A1 | 2/2008 | Berkman et al. |
| 2008/0039141 | A1 | 2/2008 | Claussen et al. |
| 2008/0181291 | A1 | 7/2008 | Zhou et al. |
| 2008/0239953 | A1 | 10/2008 | Bai et al. |
| 2009/0034453 | A1 | 2/2009 | Motegi et al. |
| 2009/0047956 | A1 | 2/2009 | Moe et al. |
| 2009/0124262 | A1 | 5/2009 | Vela et al. |
| 2009/0129448 | A1 | 5/2009 | Koslov et al. |
| 2009/0163223 | A1 | 6/2009 | Casey |
| 2009/0186627 | A1 | 7/2009 | Zhang |
| 2010/0088410 | A1 | 4/2010 | Ridley |
| 2010/0232390 | A1 | 9/2010 | Varma et al. |
| 2010/0254354 | A1 | 10/2010 | Sutivong et al. |
| 2011/0130144 | A1 | 6/2011 | Schein et al. |
| 2011/0176424 | A1 | 7/2011 | Yang et al. |
| 2011/0182224 | A1 | 7/2011 | Ishii |
| 2011/0228687 | A1 | 9/2011 | Catovic et al. |
| 2011/0292821 | A1 | 12/2011 | Chin et al. |
| 2012/0044908 | A1 | 2/2012 | Spinelli et al. |
| 2012/0236717 | A1 | 9/2012 | Saska et al. |
| 2013/0077482 | A1 | 3/2013 | Krishna et al. |
| 2013/0130691 | A1 | 5/2013 | Zhu et al. |
| 2013/0337814 | A1 | 12/2013 | Wong et al. |
| 2015/0065136 | A1 | 3/2015 | Lee et al. |
| 2015/0289216 | A1 | 10/2015 | Xing et al. |
| 2017/0078062 | A1 | 3/2017 | Park et al. |
| 2017/0295497 | A1 | 10/2017 | Macmullan et al. |
| 2017/0311276 | A1 | 10/2017 | Tsai et al. |
| 2017/0332335 | A1 | 11/2017 | Au et al. |
| 2022/0132326 | A1 * | 4/2022 | Wang ................ H04W 72/1268 |

FOREIGN PATENT DOCUMENTS

| | | | | |
|---|---|---|---|---|
| CN | 113453351 | A * | 9/2021 | ......... H04L 27/2613 |
| CN | 114944907 | A * | 8/2022 | ......... H04L 27/2613 |
| WO | WO-2016122131 | A1 * | 8/2016 | ............ H04W 16/24 |

OTHER PUBLICATIONS

Lucena et al., "Some Extensions of Biased Random-Key Genetic Algorithms", Proceedings of the 46th Brazilian Symposium of Operational Research, 2014, pp. 2469-2480.

Gonçalves et al., "Biased Random-Key Genetic Algorithmsfor Combinatorial Optimization", Journal of Heuristics, vol. 17, 2011, pp. 487-525.

Andrade et al., "Evolutionary Algorithm for the k-Interconnected Multi-Depot Multi-Traveling Salesmen Problem", Proceedings of the 15th Annual Conference on Genetic and Evolutionary Computation, GECCO'13, 2013, pp. 463-470.

Andrade et al., "Scheduling Software Updates for Connected Cars with Limited Availability", Applied Soft Computing Journal, vol. 82, No. 105575, 2019, pp. 1-24.

Faria et al., "A Biased Random Key Genetic Algorithm Applied to the Electric Distribution Network Reconfiguration Problem", Journal of Heuristics, Aug. 16, 2017, 18 pages.

Prasetyo et al., "Survey on Applications of Biased-Random Key Genetic Algorithms for Solving Optimization Problems", IEEE, 2015, 8 pages.

Pessoa et al., "A Biased Random-Key Genetic Algorithm for the Tree of Hubs Location Problem", Optimization Letters, 2016, 14 pages.

Londe et al., "An Evolutionary Approach for the P-Next Center Problem", Expert Systems With Applications, vol. 175, No. 114728, 2021, 18 pages.

Ribeiro et al., "Path-Relinking Intensification Methods for Stochastic Local Search Algorithms", Journal of Heuristics, 2012, pp. 1-23.

Welsh et al., "An Upper Bound for the Chromatic Number of aGraph and its Application to Timetabling Problems", The Computer Journal, 1967, pp. 85-86.

Krumke et al., "Models and Approximation Algorithms for Channel Assignment in Radio Networks", Wireless Networks, vol. 7, 2001, pp. 575-584.

Andrade et al., "Minimizing Flowtime in a Flowshop Scheduling Problem with a Biased Random-Key Genetic Algorithm", Expert Systems With Applications, 2019, 34 pages.

Andrade et al., "Biased Random-Key Genetic Algorithms for the Winner Determination Problem in Combinatorial Auctions", Evolutionary Computation, vol. 23, No. 2, pp. 279-307.

Andrade et al., "A Hybrid Primal Heuristic for Finding Feasible Solutions to Mixed Integer Programs", European Journal of Operational Research, 2017, 26 pages.

López-Ibáñez et al., "The irace Package: Iterated Racing for Automatic Algorithm Configuration", Operations Research Perspectives, vol. 3, 2016, pp. 43-58.

Malaguti et al., "A Survey on Vertex Coloring Problems", International Transactions in Operational Research, vol. 17, 2010, pp. 1-34.

Murphey et al., "Frequency assignment problems", Handbook of Combinatorial Optimization, Springer, 2.1, 1999, pp. 295-377.

Guo et al., "Cluster Resource Assignment Algorithm for Device-to-Device Networks Based on Graph Coloring", IEEE, 2017, pp. 1700-1705.

Graf, R. F .. Modern dictionary of electronics. Newnes, 1999. 2.2.

Encyclopedia Britannica. Antenna. 2.2.

Canadian Radio-Television and Telecommunications Commission, Telecommunications Glossary, 2.2.

Holma et al., "WCDMA for UMTS: HSPA Evolution and LTE", Fourth Edition, John Wiley & Sons, 2007, 27 pages.

Londe et al., "Modelos Exatos Para Alocação Do Root Sequence Index", Lii Simposio Brasileiro de Pesquisa Operacional, 2020, 13 pages (English Abstract only).

ONAP. Open network automation platform. 2.3.

Garey et al., "Computers and Intractability: A Guide to the Theory of NP-Completeness", W.H.Freeman&Co, New York, 1979.

Brown, Randall J. "Chromatic Scheduling and the Chromatic No. Problem", Management Science, vol. 19, No. 4, 1972, 456-463.

Leighton, Frank Thomson "A Graph Coloring Algorithm for Large Scheduling Problems", Journal of research of the national bureau of standards, vol. 84, No. 6, 1979, pp. 489-506.

Brelaz, Daniel "New Methods to Color the Vertices of a Graph", Communications of the ACM, vol. 22, No. 4, Apr. 1979, pp. 251-256.

Hertz et al., "Using Tabu Search Techniques for Graph Coloring", Computing, vol. 39, 1987, pp. 345-351.

Fleurent et al., "Genetic and Hybrid Algorithms for Graph Coloring", Annals of Operations Research, vol. 63, 1996, pp. 437-461.

Costa et al., "Ants can Colour Graphs", Journal of the Operational Research Society, vol. 48, 1997, pp. 295-305.

Galinier et al., "Hybrid Evolutionary Algorithms for Graph Coloring", Journal of Combinatorial Optimization, vol. 3, 1999, pp. 379-397.

Kassotakis et al., "A Hybrid Genetic Approach for Channel Reuse in Multiple Access Telecommunication Networks", IEEE Journal on Selected Areas in Communications, vol. 18, No. 2, Feb. 2000, pp. 234-243.

Chiarandini et al., "An Application of Iterated Local Searchto the Graph Coloring Problem", Proceedings of the Computational Symposium on Graph Coloring and its Generalizations, 2002, pp. 1-13.

Barbosa et al., "Two Novel Evolutionary Formulations of theGraph Coloring Problem", Journal of Combinatorial Optimization, vol. 8, 2004, pp. 41-63.

(56) References Cited

OTHER PUBLICATIONS

Galinier et al., "A Survey of Local Search Methods for Graph Coloring", Computers & Operations Research, vol. 33, 2006, pp. 2547-2562.
Méndez-Díaz et al., "A Branch-and-cut Algorithm forGraph Coloring", Discrete Applied Mathematics, vol. 154, 2006, pp. 826-847.
Méndez-Díaz et al., "A Cutting Plane Algorithm for Graph Coloring", Discrete Applied Mathematics, vol. 156, 2008, pp. 159-179.
Hu et al., "On Maximum Differential Graph Coloring", International Symposium on Graph Drawing, 2010, 13 pages.
Malaguti et al., "An Exact Approach for the Vertex Coloring Problem", Discrete Optimization, vol. 8, 2011, pp. 174-190.
Shukl et al., "A List based Approach to Solve Graph Coloring Problem", Proceedings of the SMART, International Conference on System Modeling & Advancement in Research Trends, IEEE, 2018, pp. 265-267.
Aardal et al., "Models and Solution Techniques for Frequency Assignment Problems", Annals of Operations Research, vol. 153, 2007, pp. 79-129.
Cuppini, Monica "A Genetic Algorithm for Channel Assignment Problems", Communication Network, vol. 5, No. 2, Mar.-Apr. 1994, pp. 157-166.
Dorne et al., "An Evolutionary Approach for Frequency Assignment in Cellular Radio Networks", Proceedings of 1995 IEEE International Conference on Evolutionary Computation, 1995, 6 pages.
Smith et al., "Improving Heuristics for the Frequency Assignment Problem ", European Journal of Operational Research, vol. 107, 1998, pp. 76-86.
Chakraborty, Goutam "An Efficient Heuristic Algorithm for Channel Assignment Problem in Cellular Radio Networks", IEEE Transactions on Vehicular Technology, vol. 50, No. 6, Nov. 2001, pp. 1528-1539.
Alabau et al., "New Hybrid Genetic Algorithms for the Frequency Assignment Problem", IEEE transactions on broadcasting, 2002, 7 pages.
Kendail et al., "Channel Assignment Optimisation Using a Hyper-Heuristic", Proceedings of the 2004 IEEE, Conference on Cybernetics and Intelligent Systems, 2004, pp. 791-796.
Bandh et al., "Graph Coloring Based Physical-Cell-ID Assignment for LTE Networks", Proceedings of the International Conference on Wireless Communications and Mobile Computing: Connecting the World Wirelessly, 2009, 5 pages.
Ahmed et al., "Distributed Graph Coloring for Self-Organization in LTE Networks", Journal of Electrical and Computer Engineering, 2010, pp. 1-10.
Xu et al., "Model of Hypergraph Colouring for Self-configuration in LTE Networks", International Conference on Information Management, Innovation Management and Industrial Engineering, IEEE, 2011, pp. 393-396.
Pratap et al., "Randomized Graph Coloring Algorithm for Physical Cell ID Assignment in LTE-A Femtocellular Networks", Wireless Personal Communications, Jul. 25, 2016, 23 pages.
Alon et al., "T-choosability in graphs", Discrete Applied Mathematics, Discrete Applied Mathematics, vol. 82, 1998, pp. 1-13.
McDiarmid, C. "Discrete Mathematics and Radio Channel Assignment", Recent Advances in Algorithms and Combinatorics, 2003, pp. 27-63.
Mirjalili, S. "Genetic algorithm", Evolutionary Algorithms and Neural Networks, 2019, pp. 43-55.
Whitley et al., "The Island Model Genetic Algorithm: On Separability, Population Size and Convergence", Journal of Computing and Information Technology, 1998, pp. 1-17.
Toso et al., "A C++application Programming Interface for Biased Random-key Genetic Algorithms", Optimization Methods & Software, 2014, pp. 1-13.
Pandey et al., "A Comparative Review of Approaches to Prevent Premature Convergence in GA", Applied Soft Computing, 2014, 36 pages.
Kendall, M. G. "A New Measure of Rank Correlation", Biometrika, 1938, pp. 81-93.
Notice of Allowance received for U.S. Appl. No. 13/557,960 dated Jan. 16, 2014, 21 pages.
Non-Final Office Action received for U.S. Appl. No. 13/686,868 dated Apr. 21, 2014, 25 pages.
Non-Final Office Action received for U.S. Appl. No. 13/691,495 dated Apr. 8, 2014, 21 pages.
Non-Final Office Action received for U.S. Appl. No. 14/035,751 dated Jul. 23, 2014, 22 pages.
Notice of Allowance received for U.S. Appl. No. 14/253,768 dated Sep. 12, 2014, 29 pages.
Final Office Action received for U.S. Appl. No. 13/691,495 dated Oct. 14, 2014, 28 pages.
Final Office Action received for U.S. Appl. No. 14/035,751 dated Nov. 21, 2014, 27 pages.
Non-Final Office Action received for U.S. Appl. No. 13/691,495 dated Feb. 25, 2015, 28 pages.
Non-Final Office Action received for U.S. Appl. No. 14/719,957 dated Jul. 7, 2015, 23 pages.
Final Office Action received for U.S. Appl. No. 13/691,495 dated Aug. 13, 2015, 14 pages.
Final Office Action received for U.S. Appl. No. 14/719,957 dated Nov. 25, 2015, 21 pages.
Non-Final Office Action for U.S. Appl. No. 16/148,260 dated Apr. 1, 2019, 27 pages.
Non-Final Office Action received for U.S. Appl. No. 16/513,588 dated Feb. 19, 2020, 29 pages.
Notice of Allowance received for U.S. Appl. No. 17/060,963 dated Sep. 8, 2021, 39 pages.
Gupta et al., "A survey of 5G network: Architecture and Emerging Technologies", IEEE, 2015, pp. 1-26.
"Strategy Analytics", Internet of Things Now Nos. 22 Billion Devices But Where Is The Revenue?, URL: https://www.strategyanalytics.com/accessservices/devices/connected-home/consumer-electronics/reports/reportdetail/global-connected-and-iot-device-forecast-update, 2019, Access dated Apr. 16, 2020, 2 pages.
Osseiran et al., "Scenarios for 5G Mobile and Wireless Communications: The Vision of the METIS Project", IEEE Communications Magazine, May 2014, pp. 26-35.
Palattella et al., "Internet of Things in the 5G Era: Enablers, Architecture and Business Models", IEEE, 2015, pp. 1-17.
Shamganth et al., "A Survey on Relay Selection in CooperativeDevice-to-Device (D2D) Communication for 5G Cellular Networks", International Conference on Energy, Communication, Data Analytics and Soft Computing (ICECDS-2017), 2017, pp. 42-46.
Liu et al., "The Demand and Development of Internet of Things for 5G:A Survey", IEEE International Conference on Consumer Electronics, 2018, 2 pages.
Andrade et al., "A Biased Random-Key Genetic Algorithm for Wireless Backhaul Network Design", Applied Soft Computing, 2015, pp. 1-20.
Verissimo et al., "PCI and RSI Conflict Detection in a RealLTE Network Using Supervised Learning", The Radio Science Bulletin, vol. 364, Mar. 2018, pp. 11-19.
Malaguti et al., "A Metaheuristic Approach forthe Vertex Coloring Problem", Informs Journal on Computing, vol. 20, No. 2, 2008, pp. 302-316.
Hale, William K. "Frequency Assignment: Theory and Applications", Proceedings of the IEEE, vol. 68, No. 12, Dec. 1980, pp. 1497-1514.
Siddiqi et al., "A Neighborhood Search-Based Heuristic for the Fixed Spectrum Frequency Assignment Problem", Arabian Journal for Science and Engineering, Jun. 14, 2018, 10 pages.
Marsa-Maestre et al., "Nonlinear Negotiation Approaches for Complex-Network Optimization: A Study Inspired by Wi-Fi ChannelAssignment", Group Decision and Negotiation, Nov. 22, 2018, 22 pages.
Zhao et al., "Interference Graph Based Channel AssignmentAlgorithm for D2D Cellular Networks", IEEE Access, vol. 6, 2018, pp. 3270-3279.
Acedo-Hernández et al., "A PCI Planning Algorithm for Jointly Reducing Reference Signal Collisions in LTE Uplink and Downlink", Computer Networks, vol. 119, 2017, pp. 112-123.

(56) References Cited

OTHER PUBLICATIONS

Chen et al., "The Requirements, Challenges, and Technologies for 5G of Terrestrial Mobile Telecommunication", IEEE Communications Magazine, May 2014, pp. 36-43.
Alsharif et al., "Small Cells Integration with the Macro-Cell Under LTE Cellular Networks and Potential Extension for 5G", Journal of Electrical Engineering & Technology, 2019, 11 pages.
Cox, C. "An Introduction to LTE, LTE-advanced, SAE, Volte and 4GMobile Communications", Second Edition, Wiley Publishing, New York, 2014.
Hao et al., "Ultra Dense Network: Challenges, Enabling Technologies and New Trends", China Communications, Feb. 2016, pp. 30-40.
Cormen et al., Algoritmos: Teoria e Prática, Editora Campus, 2002.
Marappan et al., "Solution to Graph Coloring Using Genetic and Tabu Search Procedures", Arabian Journal for Science and Engineering, 2017, 18 pages.
Mabrouk et al., "On a Parallel Genetic-Tabu Search Based Algorithm for Solving the Graph Colouring Problem", European Journal of Operational Research, vol. 197, 2009, pp. 1192-1201.
Douiri et al., "Solving the Graph Coloring Problem Via HybridGenetic Algorithms", Journal of King Saud University—Engineering Sciences, 2014, pp. 1-5.
Lu et al., "A Memetic Algorithm for Graph Coloring", European Journal of Operational Research, vol. 203, 2010, pp. 241-250.
Sharma et al., "A Tree Based Novel Approach for Graph Coloring Problem Using Maximal Independent Set", Wireless Personal Communications, 2019, 13 pages.
Bui et al., "An Ant-Based Algorithm for Coloring Graphs", Discrete Applied Mathematics, vol. 156, 2008, pp. 190-200.
Dowsland et al., "An Improved Ant Colony Optimisation Heuristic for Graph Colouring", Discrete Applied Mathematics, vol. 156, 2008, pp. 313-324.
Caramia et al., "Coloring Graphs by Iterated Local Search Traversing Feasible and Infeasible Solutions", Discrete Applied Mathematics, vol. 156, 2008, pp. 201-217.
Junosza-Szaniawski et al., "An Exact Algorithm for the Generalized List T-coloring Problem", Discrete Mathematics and Theoretical Computer Science, vol. 16, No. 3, 2014, pp. 77-94.
Sun et al., "A Method of PCI Planning in LTE Based on Genetic Algorithm", Progress in Electromagnetics Research, 2012, pp. 1575-1578.
Klincewicz, John G. "Using GRASP to Solve the Generalised GraphColouring Problem with Application to Cell Site Assignment ", International Journal of Mobile Network Design and Innovation, vol. 4, No. 3, 2012, pp. 148-156.
Ahmed et al., "Self Organized Physical Cell ID Assignment inMulti-operator Heterogeneous Networks", IEEE, 2015, 5 pages.
Kowalik et al., "Assigning Channels Via the Meet-in-the-MiddleApproach", Algorithmica, May 13, 2015, 18 pages.
Liu, Daphne Der-Fen "T-colorings of Graphs ", Discrete Mathematics, vol. 101, 1992, pp. 203-212.
Costa, Daniel "On the Use of Some Known Methods forT-Colorings of Graphs", Annals of Operations Research, vol. 41, 1993, pp. 343-358.
Mostafaie et al., "A Systematic Study on Meta-Heuristic Approaches for Solving the Graph Coloring Problem", Computers and Operations Research, 2019, 61 pages.

\* cited by examiner

PROCESS 1: OBTAINING THE COLORING COST

Input: Vector $RSI \in \mathbb{Z}^n$ where $n$ is the number vertices; type of objective.
Output: Total coloring cost.

1    Initialize NumChanges, NumConflicts as zero;
2    Initialize MinEdgeSpan as MaxDist;
3    foreach $(i,j) \in E$ do
4        if (MaxDist < $|RSI_i - RSI_j|$) or (MinDist > $|RSI_i - RSI_j|$) then
5             NumConflicts ← NumConflicts + 1;
6    if Objective is *"minimize Changes"* then
7        foreach $i \in V$ do
8            if $RSI_i \neq OldRSI_i$ then
9                 NumChanges ← NumChanges + 1;
10       ColoringCost ← NumChanges + $C$ · NumConflicts;
11    else             // Objective is maximize minimal edge span
12        foreach $(i,j) \in E$ do
13            if MaxDist ≥ $|RSI_i - RSI_j|$ ≥ MinDist then
14                 if $|RSI_i - RSI_j|$ ≤ MinEdgeSpan then
15                       MinEdgeSpan ← $|RSI_i - RSI_j|$;
16       ColoringCost ← MinEdgeSpan − $C$ · NumConflicts ;
17    if NumConflicts ≥ 0 then
18        ColoringCost ← Correction(RSI);
19    ColoringCost ← Local Search(RSI, ColoringCost);
20    return ColoringCost

FIG. 6

PROCESS 2: Coloring the graph – decoder LD.

Input: Chromosome/vector $v \in [0,1]^n$ where $n$ is the number of vertices.
Output: Total coloring cost.

1 Let $\gamma$ to be a permutation of vertices induced by the non-decreasing order of corresponding keys in $v$;
2 Initialize RSI as zero-vector;
3 foreach $i \in \gamma$ *in the given order* do
4    if $i$ *is first in order* then
5       $RSI_i \leftarrow OldRSI_i$;
6    else
7       CandidateColor $\leftarrow OldRSI_i$;
8       Possible $\leftarrow$ *true*;
9       foreach $j$ *adjacent to* $i$ and $RSI_j \neq 0$ do
10          if $(|RSI_j - CandidateColor| > MaxDist)$ or $(|RSI_j - CandidateColor| < MinDist)$ then
11             Possible $\leftarrow$ *false*;
12       if Possible then
13          $RSI_i \leftarrow$ CandidateColor;
14       else
15          CandidateColor $\leftarrow$ minRSI;
16          while CandidateColor $\leq$ maxRSI do
17             foreach $j$ *adjacent to* $i$ and $RSI_j \neq 0$ do
18                 if $(|RSI_j - CandidateColor| > MaxDist)$ or $(|RSI_j - CandidateColor| < MinDist)$ then
19                    Possible $\leftarrow$ *false*;
20             if Possible then
21                $RSI_i \leftarrow$ CandidateColor;
22                break;
23             else
24                CandidateColor $\leftarrow$ CandidateColor $+ 1$;
25    if $RSI_i = 0$ then
26       $RSI_i \leftarrow OldRSI_i$;
27 ColoringCost $\leftarrow$ CalculateCost(RSI);
28 return ColoringCost

FIG. 7

PROCESS 3: Coloring the graph – decoder SC.

Input: Chromosome/vector $v \in [0,1]^n$ where $n$ is the number of vertices.
Output: Total coloring cost.

1 Let $\tau$ to be the gene value of vertices induced by the value of corresponding keys in $v$;
2 Initialize $RSI$ as zero-vector;
3 foreach $i \in \tau$ do
4 $\quad RSI_i \leftarrow \tau_i \cdot (maxRSI - minRSI) + minRSI$;
5 $ColoringCost \leftarrow \text{CalculateCost}(RSI)$;
6 return $ColoringCost$

FIG. 8

PROCESS 4: Coloring the graph – decoder KD.

Input: Chromosome/vector $v \in [0,1]^{k+1}$ where $k+1$ is the number of possible colors.
Output: Total coloring cost.

1 Let $\kappa$ be a permutation of colors induced by the non-decreasing order of corresponding keys in $v$;
2 Let $\delta$ to be a permutation of vertices induced by the non-increasing order of corresponding degrees;
3 Initialize RSI as zero-vector;
4 foreach $k \in \kappa$ in *the given order* do
5     foreach $i \in \delta$ in *the given order* do
6        if OldRSI$_i = k$ and RSI$_i = 0$ then
7           Possible $\leftarrow$ *true*;
8           foreach $j$ *adjacent to* $i$ do
9             if RSI$_j \neq 0$ then
10               if $|$RSI$_j - k| >$ MaxDist or $|$RSI$_j - k <$ MinDist$|$ then
11                 Possible $\leftarrow$ *false*;
12           if Possible then
13             RSI$_i \leftarrow k$;

14 foreach $k \in \kappa$ in *the given order* do
15     foreach $i \in \delta$ in *the given order* do
16        if OldRSI$_i \neq k$ and RSI$_i = 0$ then
17           Possible $\leftarrow$ *true*;
18           foreach $j$ *adjacent to* $i$ do
19             if RSI$_j \neq 0$ then
20               if $|$RSI$_j - k| >$ MaxDist or $|$RSI$_j - k <$ MinDist$|$ then
21                 Possible $\leftarrow$ *false*;
22           if Possible then
23             RSI$_i \leftarrow k$;

24 foreach $i \in \delta$ in *the given order* do
25     if RSI$_i = 0$ then
26        RSI$_i \leftarrow$ OldRSI$_i$;

27 ColoringCost $\leftarrow$ CalculateCost(RSI);
28 return ColoringCost

FIG. 9

PROCESS 5: Shaking for permutation genes.

Input: Whole population; chromosome size |V|.
Output: New population.

1  foreach Chromosome ∈ *Elite Set* do
2     NumberGenes ← ShakingStrenght · n · rand();
3     for $0 \le i \le$ NumberGenes do
4        target ← rand() · n;
5        Chromosome[target] ← Chromosome[target + 1];
6        Chromosome[target + 1] ← Chromosome[target];
7  Reset all non-elite chromosomes;

FIG. 10

PROCESS 6: Shaking for non-permutation genes.

Input: Whole population; chromosome size |V|.
Output: New population.

1 foreach Chromosome ∈ *Elite Set* do
2      NumberGenes ← ShakingStrenght · n · rand();
3      for 0 ≤ i ≤ NumberGenes do
4          target ← rand() · n;
5          Chromosome[target] ← 1 − Chromosome[target];
6 Reset all non-elite chromosomes;

FIG. 11

FACILITATING ASSIGNMENT OF ROOT SEQUENCE INDEXES WHILE MINIMIZING NETWORK CHANGES

TECHNICAL FIELD

This disclosure relates generally to the field of network configuration and, more specifically, to facilitating root sequence index assignments of cells, e.g., in fifth generation (5G) or other advanced networks.

BACKGROUND

Root Sequence Index (RSI) assignment is a parameter of radio access networks (RANs). There is a random access procedure for establishing upload channels between user equipment and network equipment, and the RSI is used to calculate variables of the Physical Random Access Channel (PRACH). For example, a user equipment gains uplink access to the network based on random access preambles which are generated based on RSI of the cells. The total number of RSIs are limited and, therefore, need to be reused and several cells in a network will share the same RSI. RSI conflicts in RSI assignments result in network performance degradations in UE cell (re)selections, handovers, user equipment synchronization, and radio frequency condition status estimates.

Accordingly, unique challenges exist associated with network configuration and RSI assignment in advanced networks.

BRIEF DESCRIPTION OF THE DRAWINGS

Various non-limiting embodiments are further described with reference to the accompanying drawings in which:

FIG. 6 illustrates a process for a decoder that obtains a coloring cost separately in accordance with one or more embodiments described herein;

FIG. 7 illustrates a process for a logic direct decoder in accordance with one or more embodiments described herein;

FIG. 8 illustrates a process for a simple coloring decoder in accordance with one or more embodiments described herein;

FIG. 9 illustrates a process for a color ordered by degrees decoder in accordance with one or more embodiments described herein;

FIG. 10 illustrates a process for a shaking procedure for a logic direct decoder and/or a color ordered by degrees decoder in accordance with one or more embodiments described herein;

FIG. 11 illustrates a process for a shaking procedure for a simple coloring decoder in accordance with one or more embodiments described herein;

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate assignment of root sequence indexes while minimizing and/or reducing network changes. Physical Cell Identity (PCI) and Root Sequence Index (RSI) assignments are necessary for network deployment. In addition, to keep the deployment and operational costs low, the PCI/RSI assignment process should be optimized and automated.

In this regard for the avoidance of doubt, any embodiments described herein in the context of optimizing RSI assignments or allocations are not so limited and should be considered also to cover any techniques that implement underlying aspects or parts of the described aspects to improve or increase RSI distance and/or reduce and/or mitigate a number of RSI changes needed, even if resulting in a sub-optimal variant obtained by relaxing aspects or parts of a given implementation or embodiment.

Figure 1:
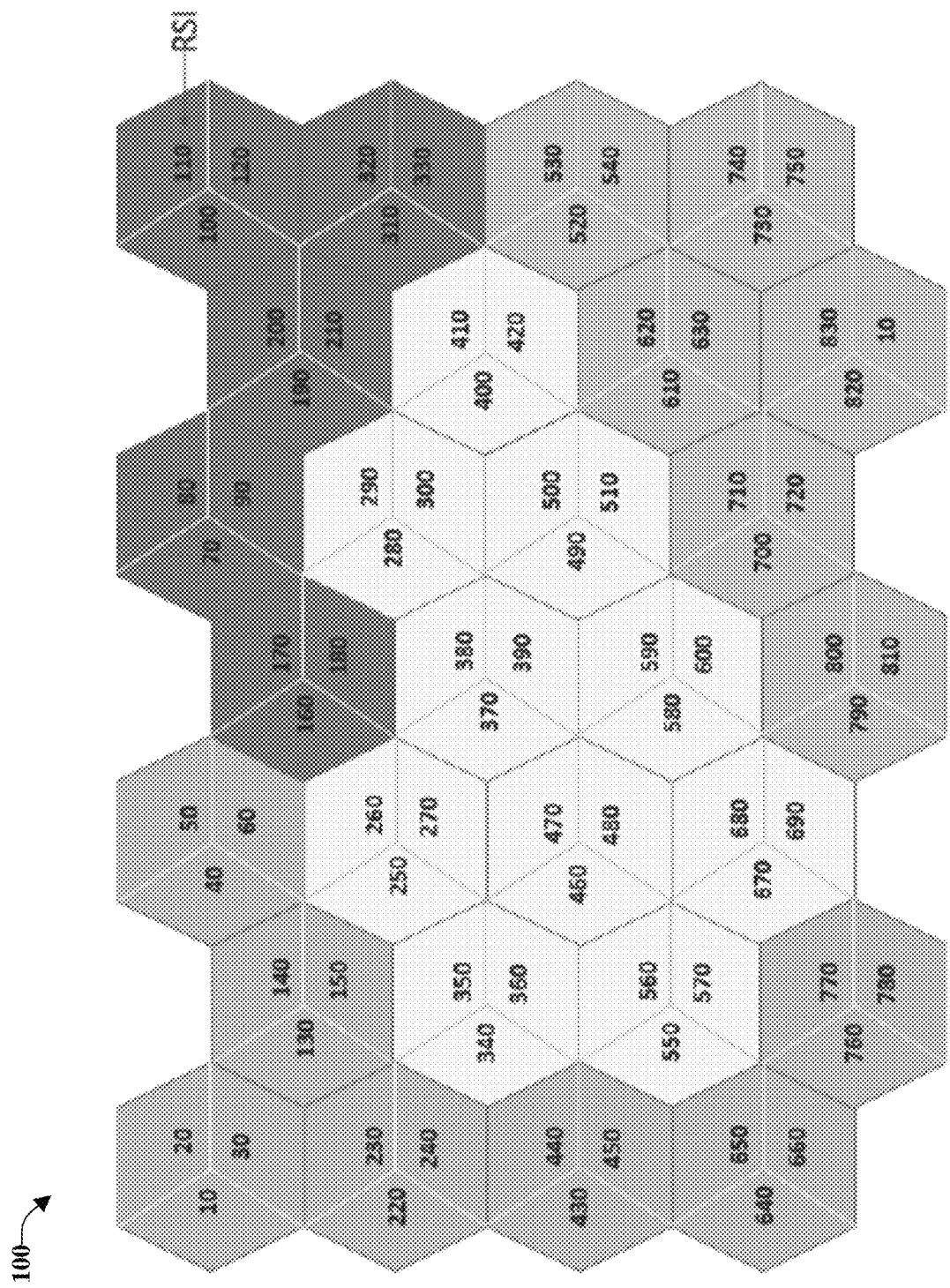
FIG. 1 illustrates an example, non-limiting, schematic representation of a root sequence index assignment deployed in a wireless communications network.

FIG. 1 illustrates an example, non-limiting, schematic representation of an RSI assignment deployed in a wireless communications network 100. In this example, the minimum distance between the RSI of neighbor antennas is ten units and there is no maximum distance.

Each hexagon represents network equipment (e.g., radio base stations) with three antennas in coverage angles of 120 degrees each. The edges of each hexagon indicate adjacent antennas, which have at least a difference of ten units between their respective RSI. Hexagons of different shading indicate different user equipment (UE) in different regions or markets.

For example, the cell label with RSI 110 indicates that RSI 110 through RSI 119 are assigned to that cell. In another example, the cell labeled with RSI 260 indicates that RSI 260 through RSI 269 are assigned to that cell. In a further example, the cell labeled with RSI 380 indicates that RSI 380 through RSI 389 are assigned to that cell, and so forth. The cells are also assigned so that no two adjacent cells have the same RSIs. Otherwise, same access preambles will be generated from two neighboring cells, causing uplink random access failures to the UEs at the edge of the two neighboring cells.

Note that although there are only adjacent antennas inside a hexagon in FIG. 1, the signals overlap between antennas in real life. Therefore, the problem cannot be modeled as a simple planar graph. This situation is a common case in 5G: generally, there is a macro cell for coverage and several small cells for network capacity inside the coverage radius of the macro cell. Thus, the small cells can interfere between themselves (e.g., between small cells) and between the small cells and the macro cell.

Since network equipment have overlap on coverage area (referred to as neighbor cells), different RSIs should be assigned for neighbor cells so that a UE can connect to the correct cell. Neighboring RSIs are to be, at least, at a given distance to avoid interference (minDist). A communications network (e.g., a 5G network) is inserted in the context of ultra-dense networks. Thus, the potential placement of antennas or radios within only a few meters of distance can cause potential interference with one another. This indicates that the defining of a maximal distance (maxDist) is adequate in order to set a higher number of antennas in each neighborhood.

For example, by setting a maxDist, fine control of the deployed RSI can be enabled. Further, it can be ensured that RSIs are available for the next cell deployment during the network densification. Therefore, two neighboring cells u and v should have:

$$\text{minDist} \leq |RSI_u - RSI_v| \leq \text{maxDist}$$

Figure 2:
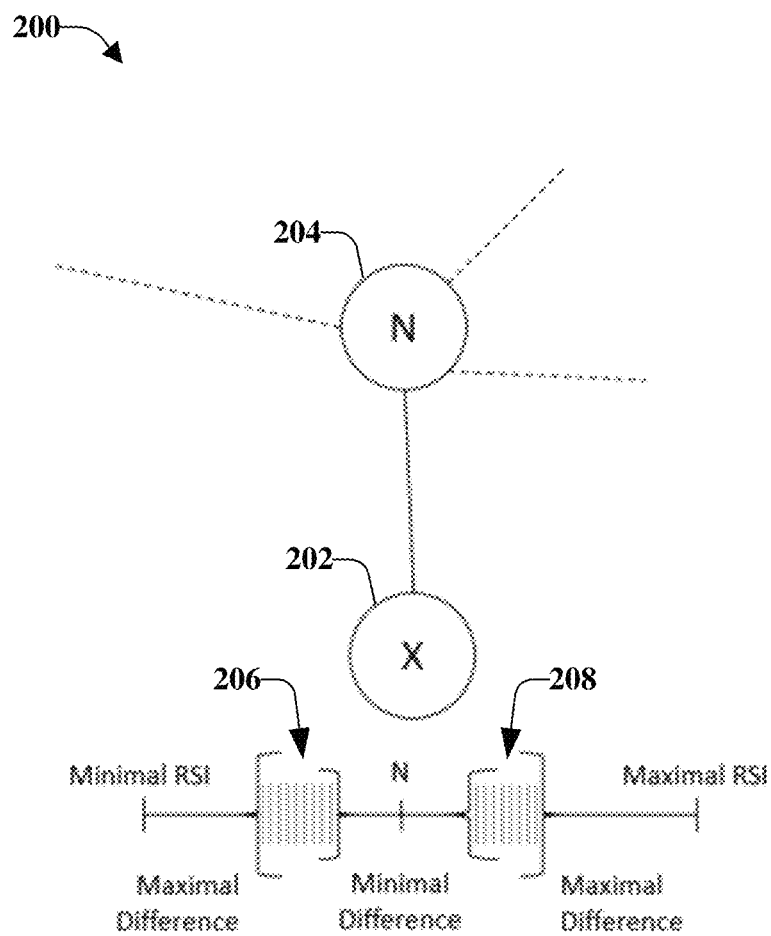
FIG. 2 illustrates an example, non-limiting, representation of a first allocation of RSI assignments for network equipment.

FIG. 2 illustrates an example, non-limiting, representation of a first allocation of RSI assignments for network equipment. In this example, an RSI for a vertex with only one edge is depicted. A first cell X 202 has a single neighbor, cell N 204. The RSI values for cell X 202 should be inside the intervals indicated by the hatches 206 and 208. These values represent the minimum and maximum difference and are inside the possible values for the RSI.

Figure 3:
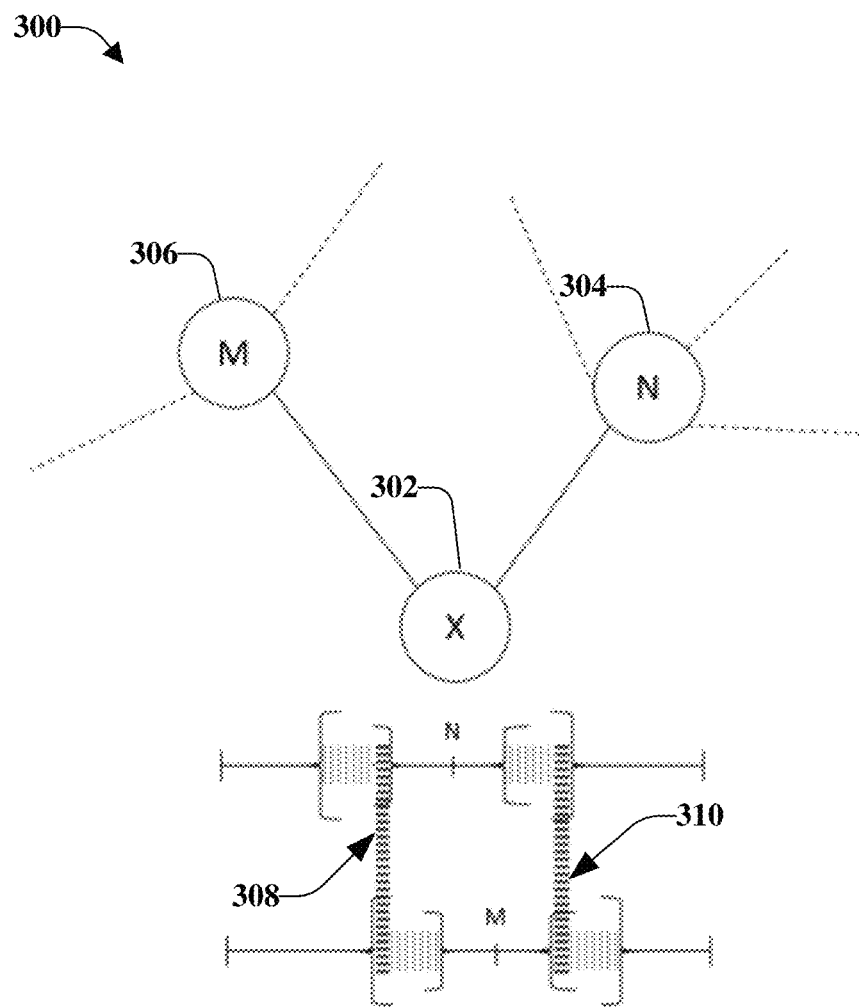
FIG. 3 illustrates an example, non-limiting, representation of a second allocation of RSI assignments for network equipment.

FIG. 3 illustrates an example, non-limiting, representation of a second allocation of RSI assignments for network equipment. In this example, there is more than one adjacent cell. Thus, a cell X 302 has two neighbors, a second cell N 304 and a third cell M 306. The RSI of cell X 302 should respect the distances for both neighbors (cell N 304 and cell M 306). This decreases the possible RSI values and, thus, increases the complexity of allocating the RSI. The possible values for the RSI of vertex X are indicated in the intervals with the hatches identified as 308 and 310 for the respective cells.

While technological constraints are known, the actual deployment of an RSI assignment is guided by various operation constraints. For example, network operators usually want to minimize the number of changes performed in the network. Further, the deployment should be performed using small batches. Smaller deployment batches provide for retaining tight track of the network effects after the change. This also minimizes issues and outages, makes possible rollbacks available in the case of failure, and mitigates and/or reduces resource utilization.

Further, it is beneficial to maximize the minimum RSI distance between all pairs of neighbor cells. This allows a well-spread assignment and promotes RSI range "holes." This can mitigate and/or reduce interference issues. This can also allow easy deployment of future radios without full network reconfiguration (e.g., because there are available RSIs in the "holes").

The operation constraints can lead to conflicting objective functions. For example, to maximize the minimal RSI distance, it might be needed to increase the number of changes in the network. Conversely, when the number of changes are minimized, there is not much room left for the process to increase the RSI distances between nodes. Therefore, there is a non-dominant multi-objective RSI assignment optimization problem.

Such non-dominant multi-objective problems generate a set of non-dominated solutions (Pareto frontier) that can be picked and chosen by the system automatically. Alternatively, the set of non-dominated solutions can be chosen manually. Therefore, the disclosed embodiments can provide a set of solutions that can be analyzed automatically and/or by a RAN specialist, which can choose or mark the suitable ones.

The not-deployed solutions can be retained in one or more databases to be used as seed solutions for posterior optimization. This improves the process performance and creates historical data for posterior analysis.

The table below illustrates two alternative solutions. Solution 1 has less changes, but also has a tight RSI range. For example, some neighbor cells are 15 units apart only. Solution 2 operates with more changes in the network, but guarantees a more spread assignment, allowing future equipment deployment to be performed more easily.

|  | Number of Changes | Maxmin dist. |
| --- | --- | --- |
| Solution 1 | 50 | 15 |
| Solution 2 | 80 | 50 |

Figure 4:
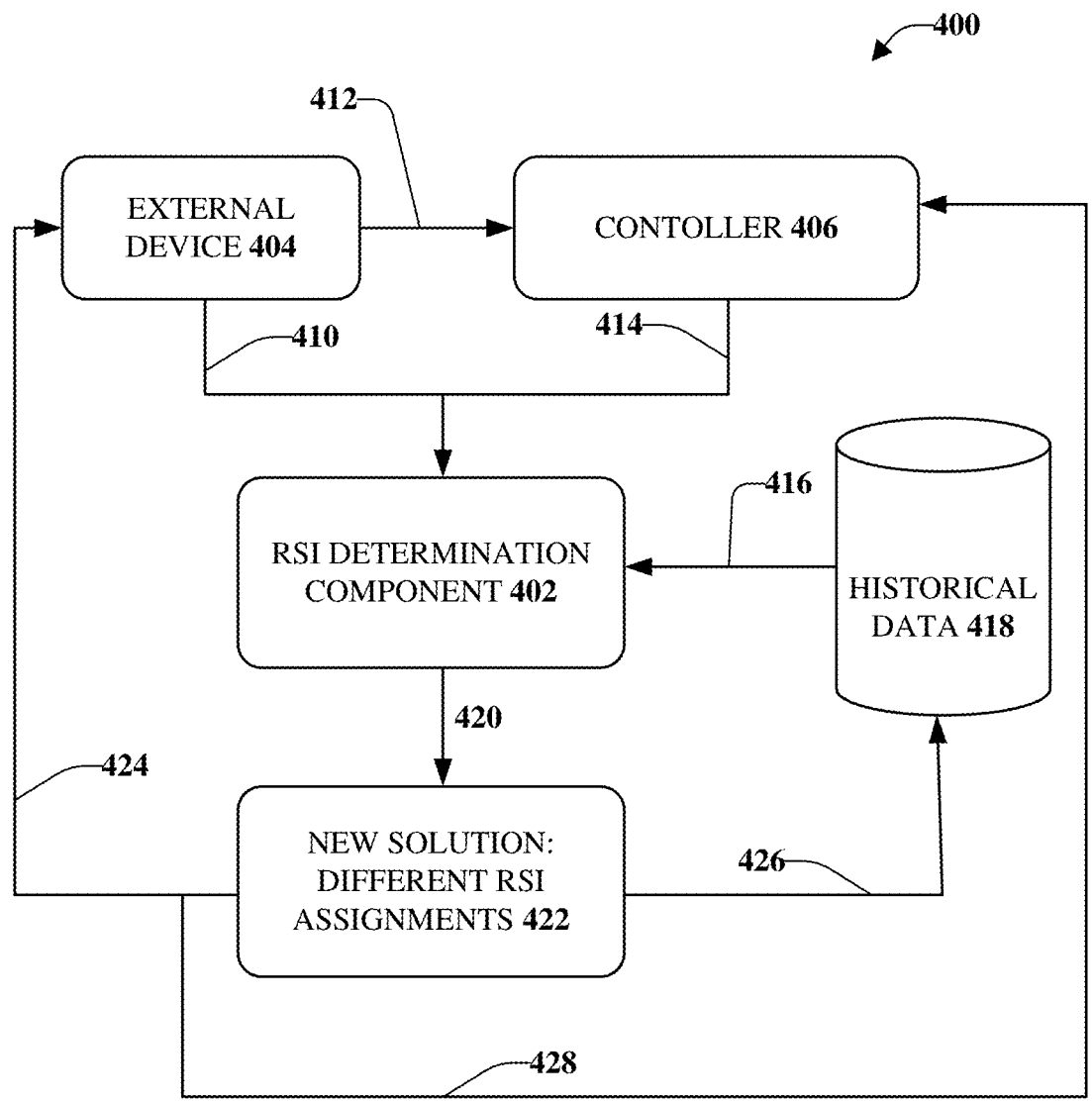
FIG. 4 illustrates an example, non-limiting, process flow for implementing root sequence index assignment and deployment, according to one or more embodiments.

FIG. 4 illustrates an example, non-limiting, process flow 400 for implementing RSI assignment and deployment, according to one or more embodiments. The process flow 400 includes an RSI determination component 402. One or more input devices, illustrated as an external device 404 and a controller 406, which can trigger RSI improvement or optimization as discussed herein. Although illustrated as two input devices, fewer or more input devices can be utilized with the disclosed embodiments. Two input devices are illustrated and described to discuss separately the input received via an external source and an internal source. For example, the external device 404 can trigger the RSI optimization based on receipt of manual input and the controller 406 can trigger the RSI optimization autonomously.

The input devices can be associated with one or more entities. As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context. As discussed above, the external device 404 can be associated with manual input (e.g., an entity associated with a network operator manually requests the RSI optimization). The manual input from the external device 404 can be communicated directly to the RSI determination component 402 (also sometimes referred to as a solver), as indicated by line 410. Alternatively, or additionally, the manual input from the external device 404 can be communicated to the RSI determination component 402 via the controller 406, as indicated by line 412.

The controller 406 is associated with a system and/or controller that triggers or implements, the RSI assignment autonomously and/or based on receipt of input from the external device 404. The communication from the controller 406 to the RSI determination component 402 is indicated by line 414. For example, the controller 406 can trigger the RSI determination component 402 automatically (e.g., automated close loop) when an invalid RSI assignment is determined and/or when new network equipment (e.g., new radios) are detected in the communication network.

Based on the request from the external device 404 (via line 410) and/or the request from the controller 406 (via line 414), the RSI determination component 402 is triggered. In further detail, when triggered either by the external device 404 or by the controller 406, various information is sent to the solver (e.g., the RSI determination component 402). The various information can include information indicative of a first listing (e.g., a first data structure) of a first set of nodes, information indicative of a second listing (e.g., a second data structure) of a second set of nodes, one or more indications of RSI distance, at least one indication of an allowed RSI range, an optimization sense, and stopping criteria.

The information indicative of the first listing of the first set of nodes can be identification information related to the nodes for which the RSI is to be changed. The information indicative of the second listing of a second set of nodes can be identification information related to the nodes for which the RSI is not to be changed. The nodes for which the RSI is not to be changed can represent blocked cells. In some implementations, there are no nodes for which the RSI is not to be changed (e.g., an empty set, or there are no nodes indicated). Even though these nodes have their RSI fixed, such nodes play a role during the optimization for their no-fixed neighbors (e.g., non-blocked cells).

The RSI distance includes the minimum RSI distance and maximum RSI distance. The indication of the allowed RSI range includes, for example, the RSI values that can be used during this assignment. The optimization sense can include minimize changes, maximize the minimum distance, or both the minimize changes and the maximize the minimum distance. The stopping criteria can include, for example, maximum time.

The RSI determination component 402, can retrieve, at 416, historical data 418 from one or more storage devices, which can be storage devices that are integrated with the system, or external storage devices that are accessible by the system. Included in the historical data 418 can be information related to previous assignments, regardless of whether such previous assignments were deployed or were not deployed. However, only solutions containing the current nodes are used. Further, both deployed and not deployed solutions are used. These solutions operate as warm starters to the current optimization process.

The RSI determination component 402 generates a collection of possible solutions. The generation of the collection of possible solutions can be based upon the historical data 418 as well as other data. For example, the RSI determination component 402 can apply a set of processes (discussed further below) for optimizing the assignment according to the optimization criteria. For example, the optimization criteria can include, but is not limited to, input parameters such as minimum RSI distance, maximum RSI distance, running time, and so on.

The RSI determination component 402 (e.g., a planner component) can determine and return one or more feasible solutions or might not be able to determine a feasible solution. Upon or after determining one or more optimized feasible solutions, the RSI determination component 402 returns only the non-dominated ones (e.g., solutions in the Pareto frontier).

When the RSI determination component 402 cannot find a feasible solution, two situations can occur. The first situation is the RSI determination component 402 proves that the problem instance is infeasible (e.g., there is no feasible solution). Then, the RSI determination component 402 sends an infeasibility proof to the user/controller (e.g., the external device 404 and/or the controller 406). In the second solution, the RSI determination component 402 does not prove infeasibility. In this case, the RSI determination component 402 sends a message or other notification to the user/controller (e.g., the external device 404 and/or the controller 406) stating that no feasible solution was found, but that such solutions could exist.

The information related to the assignment and/or the batch creation is provided, at 420, as a new solution and/or different RSI assignments 422. If the process was triggered via the external device 404, the generated non-dominated solutions (in the Pareto frontier) are sent to the external device 404, at 424, for validation. Once a solution has been chosen via the external device 404, the selection is sent, at 412, to the controller 406. The controller 406 can be configured to deploy the solution. Further, all generated solutions (the accepted and the rejected) are sent, at 426 to be logged in a database as historical data 418 for posterior use.

In further detail, an entity receives the optimization results from the solver (e.g., the RSI determination component 402). If the response contains one or more feasible solutions, the entity selects the solution desired to be deploy and sends the selected solution over to the controller (at 412). This solution is marked as "used/desired" and the others are marked as "not used", and logged in the database (e.g., as historical data 416). If the response states infeasibility, the entity can check the root cause and resubmit the optimization request relaxing the constraints (at 410). If the response states "no feasible solution found but feasible solutions can exist," the entity either can relax the constraint as in the previous step, or resubmit the optimization allowing more time for the optimization run.

Alternatively, at 428, when triggered by the controller, the optimizer sends the non-dominated solutions to the controller 406. Once the entity picks a solution, the chosen solution is sent to the controller, at 412, to deploy the solution. At 426, all generated solutions (the accepted and the rejected) are logged in the database for posterior use.

In further detail, the controller receives the optimization results from the solver (automated closed-loop). If the response contains one or more feasible solutions, the controller chooses the solution with minimal changes when the objective "minimize changes" is used. Alternatively, or additionally, the controller chooses the solution with maximal pairwise distance when objective "maximize minimum distance" is used. Alternatively, or additionally, the controller chooses the solution within a threshold when both objectives are used.

When a solution is accepted, this solution is marked as "used/desired," and the others are marked as "not used" and logged in the database (at 426). If the response states "infeasible" or "no feasible solution was found, but feasible solutions may exist," the solver can gradually relax the constraints and resubmit the optimization iteratively (at 410 or 414). If a maximum number of failures is reached, a warning message can be output. According to an implementation, the warning message can be sent to the operator for manual optimization.

Figure 5:
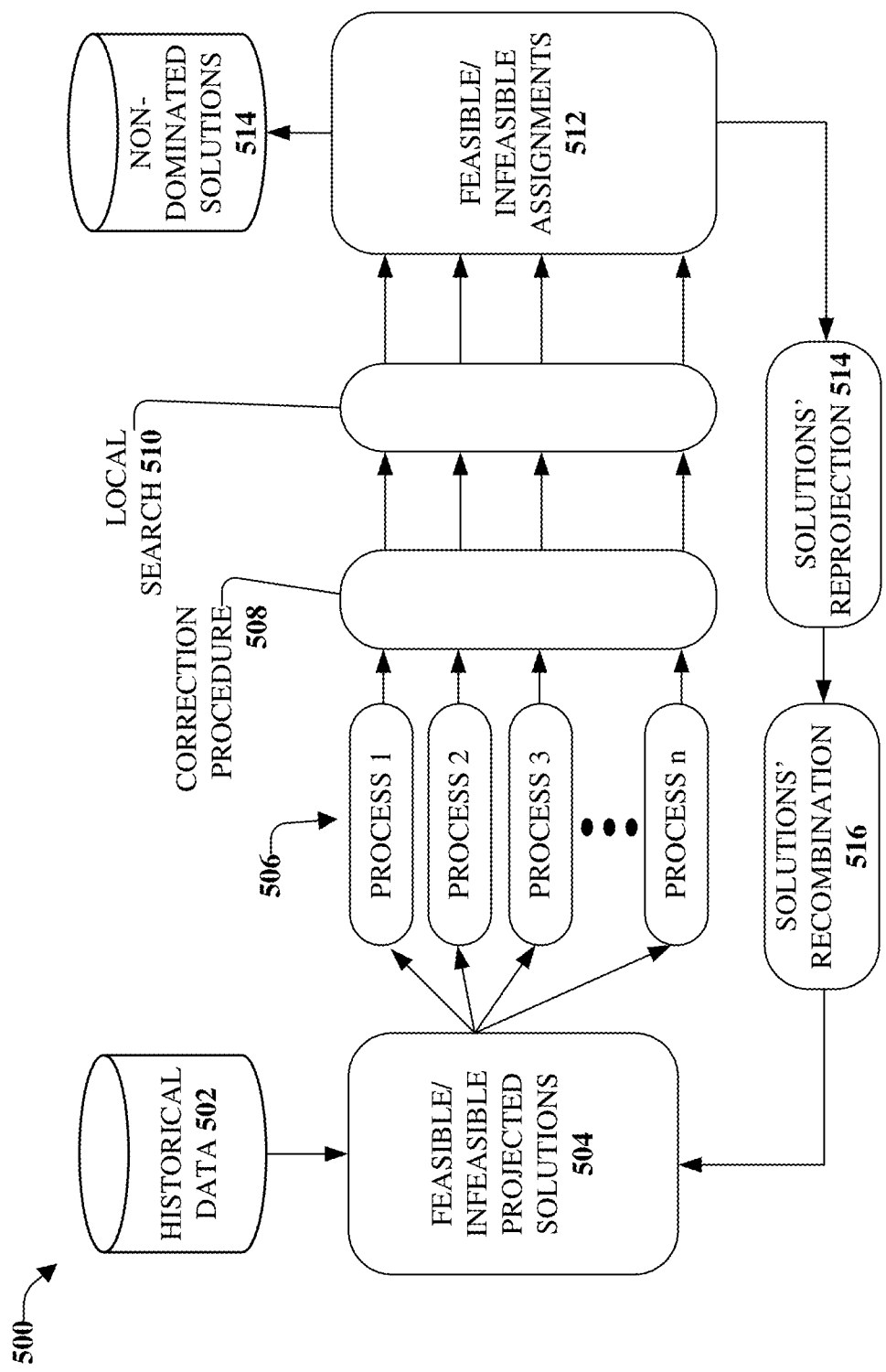
FIG. 5 illustrates an example, non-limiting, root sequence index determination system in accordance with one or more embodiments described herein.

FIG. 5 illustrates an example, non-limiting, RSI determination system 500 in accordance with one or more embodiments described herein. Repetitive description of like elements employed in other embodiments described herein is omitted for sake of brevity.

According to some implementations, the RSI determination system 500 (which can include the RSI determination component 402) is a framework that includes solutions projected in a unitary space, which are transformed by assigners or decoders to actual RSI assignment for posterior corrections and search intensifications.

Instead of using RSI assignments to represent solutions directly, each solution is projected in a unitary hyperspace so that each solution is described by a vector $v^n \in [0, 1]$, where n is the number of nodes (with possible extensions). This representation allows for the opportunity to plug-and-play different processes for RSI assignment.

Moreover, solutions can be recombined and manipulated using generic operators/procedures on the unitary space without having to reimplement custom code for each problem variation. The procedure starts with a pool of projected solutions (e.g., historical data 502), which can include solutions originated from previous runs and/or randomly generated solutions (probably infeasible).

The historical data 502 is utilized to determine a pool of projected solutions 504, which can include feasible and/or infeasible projected solutions. Each projected solution in the pool of projected solutions 504 is processed by a set of processes 506, sometimes referred to as "assigners" and/or "decoders." There are several processes, also referred to as decoders. The processes 506 can be applied at substantially the same time and/or at different times. In some implementations, one or more processes (e.g., a subset of the set of processes 506) can be applied according to some implementations.

Each process of the set of processes 506 takes, as input, a projected solution v and creates and outputs an RSI assignment. These assignments may be infeasible or feasible. The infeasible assignments are those assignments that violate one or more constraints. The constraints can be identified automatically (e.g., via the controller) and or based on received inputs (e.g., via the external device 404).

The framework applies a correction procedure 508 for the infeasible assignments. For example, the correction procedure 508 can make small changes towards the feasibility. It is still possible that this procedure fails, and therefore, the solution is declared infeasible.

For feasible solutions, the framework applies a quick process for quality intensification. The local search 510 aims to improve the objective functions by performing a search on solutions in the neighborhood of the current solution. Thus, feasible and infeasible assignments 512 are output. Upon or after completion, the non-dominated feasible solutions are gathered in a local repository 514.

The assignments are reprojected, at 514, to the unitary space. Further, the assignments are recombined, at 516, to generate new solutions. According to some implementations, the framework may inject new random solutions to the pool to increase the solution diversity. The framework iterates (e.g., via the feedback loop) until a given time and/or a given number of iterations without improving the best solutions (convergence criteria).

As discussed herein, in communications networks, the Root Sequence Index (RSI) is used to allocate uplink channels between the user equipment and network equipment (e.g., the base station). The assignment of RSIs that are close-in-range to neighbor radios may cause collisions leading to failures on service establishment and performance degradation. As provided herein, the RSI allocation problem is modeled as a version of the Frequency Assignment Problem (FAP) with additional constraints. A generalization of a classical graph coloring problem, the FAP indicates that there should be a minimum distance for assigned colors of two neighbors. For the RSI allocation, a maximal distance is also needed. As discussed herein, the RSI is allocated while minimizing the risk of collisions, for various objective functions (e.g., minimum distance, and maximal distance).

The RSI allocation problem can be defined as follows: let G=(V, E) be an undirected graph, in which V is the set of vertices (radios) and E is the set of neighborhood relations. For each vertex $v \in V$, an integer $L_{min} \leq w_v \leq L_{max}$ is to be attributed such that, for each pair of vertices $(uv) \in E$, $D_{min} \leq |w_v - w_u| \leq D_{max}$. It is assumed that each radio v has a previous or old configuration $O_v$, which indicates an initial allocation that may be illegal or infeasible. The value of $w_v$ may be interpreted as the RSI of the antenna v, or as the color of the vertex v. Therefore, the term color is used as a synonym of RSI, unless explicitly indicated otherwise.

Two objective functions are utilized herein. The first objective involves minimizing the number of changes $\Sigma_{v \in V} c_v$ between new and old network configurations, wherein V is the set of graph vertices. This objective aims to increase model realism, as this scenario occurs when new vertices are introduced in the system, and the RSI of other antennas should be modified as least as possible to avoid disruptions and degradation in the service quality. The second objective tries to maximize the smallest difference $s_{min}$ between the RSI of neighbors. This scenario considers the future need to add new vertices and the necessity of having possible RSI values available for the new vertices. Such need for the expected ultra-density in these networks is to be considered, as well as the expected increase in the coverage both in urban and rural areas.

The following parameters and decision variables are utilized herein, where Table 1 indicates the parameters and Table 2 indicates the decision variables.

TABLE 1

| | Parameters. |
|---|---|
| V | Set of Graph Vertices |
| E | Set of Graph Edges |
| $L_{min}$ | Minimum value of RSI |
| $L_{max}$ | Maximum value of RSI |
| $N_k$ | Numerical RSI Value for k |
| $O_i$ | Old RSI value configuration of vertex i |
| $D_{min}$ | Minimum distance between RSI of neighbor vertices |
| $D_{max}$ | Maximum distance between RSI of neighbor vertices |

TABLE 2

| | Decision variables. |
|---|---|
| $w_i$ | Numerical value of RSI allocated to vertex i |
| $x_{ik}$ | Binary variable indicative of allocation of RSI k to vertex i |
| $y_{ij}$ | Binary variable related to distance between RSI of vertices i and j |

TABLE 2-continued

Decision variables.

| | |
|---|---|
| $c_i$ | Binary variable indicating if there was a change on the RSI of vertex |
| $s_{min}$ | Minimum value of the difference between RSI of two neighbor vertices |

Models are presented for the RSI allocation problem. Although two models are discussed, other models that represent the RSI problem can exist. A first model discussed herein has the objective of minimizing the amount of change between new and old network configuration, which means fewer disruptions and performance loss, where.

$$\min \sum_{i \in V} c_i \quad (1a)$$

$$s.t. \sum_k x_{ik} = 1 \quad \forall\, i \in V \quad (1b)$$

$$w_i = \sum_k x_{ik} \cdot N_k \quad \forall\, i \in V \quad (1c)$$

$$D_{min} \cdot (1 - y_{ij}) - D_{max} \cdot y_{ij} \le w_i - w_j \quad \forall\, (i,j) \in E \quad (1d)$$

$$w_i - w_j \le D_{max} \cdot (1 - y_{ij}) - D_{min} \cdot y_{ij} \quad \forall\, (i,j) \in E \quad (1e)$$

$$L_{max} \cdot c_i \ge w_i - O_i \quad \forall\, i \in V \quad (1f)$$

$$L_{max} \cdot c_i \ge O_i - w_i \quad \forall\, i \in V \quad (1g)$$

As indicated above, constraint (1b) guarantees that all vertices have exactly one new RSI, while Constraint (1c) indicates the relation between the allocated RSI and its numeric value. Constraints (1d) and (1e) restrict the maximum and minimum distances using an auxiliary variable to indicate whether the difference is positive or negative. Because of model symmetry, one of the differences is positive and the other, negative.

Objective Function (1a) and Constraints (1f) and (1g) minimize the changes in configuration. Note that both (1f) and (1g) let the model register a change if the new value of the RSI is higher or lower than the old configuration.

A second model discussed herein aims to maximize the smallest difference between the RSI of neighbors, where:

$$\max s_{min} \quad (2a)$$

$$s.t. \sum_k x_{ik} = 1 \quad \forall\, i \in V \quad (2b)$$

$$w_i = \sum_k x_{ik} \cdot N_k \quad \forall\, i \in V \quad (2c)$$

$$D_{min} \cdot (1 - y_{ij}) - D_{max} \cdot y_{ij} \le w_i - w_j \quad \forall\, (i,j) \in E \quad (2d)$$

$$w_i - w_j \le D_{max} \cdot (1 - y_{ij}) - D_{min} \cdot y_{ij} \quad \forall\, (i,j) \in E \quad (2e)$$

$$s_{min} \le w_i - w_j + y_{ij} \cdot L_{max} \quad \forall\, (i,j) \in E. \quad (2f)$$

This scenario considers the future need of adding new antennas, which means that there are RSI values available for those, which is achieved by increasing the distance between used RSI of neighbors. The maximize-minimum-edge-span objective is given by Objective Function (2a), which maximizes the smallest of differences defined by Constraint (2f). Constraints (2b), (2c), (2d) and (2e) have the same purpose as constraints (1b), (1c), (1d) and (1e), respectively.

The possible $L_{min}$ and $L_{max}$ values of the RSI depend on frequency used in the analyzed network and cell size of the analyzed network, and are classed in two sequences.

Dmin and Dmax computation can based on the network technology. The following discusses an example, non-limiting, manner of computing $D_{min}$ and $D_{max}$, in 5G communication networks. However, in 6G or other advanced networks, there can be other manners of computing the $D_{min}$ and $D_{max}$ values.

By way of example and not limitation, the $D_{min}$ and $D_{max}$ values are derived from network configuration. $D_{min}$ can be calculated with a value related to the division of frequency spectrum in the network, which is the constant 64 for 5G networks, the maximum value of the sequence $L_{max}$, and the cyclic shift value $N_{CS}$. The cyclic shift also originates from network characteristics, and, therefore, the minimum needed distance is the same for all radios in the same network and sequence. The computation of the minimum distance is shown in Equation (3) below:

$$D_{min} = \frac{64}{L_{max} / N_{CS}}$$

For the $D_{max}$ value, it should be considered that the 5G network is inserted in the context of ultra-dense networks. Ultra-dense networks result from capacity enhancements needed for 5G and are synonymous with antennas or radios stationed only a few meters away from each other, thus potentially interfering with each other. This indicates that defining a maximum distance $D_{max}$ between the difference of the RSI of neighbors is adequate. Such a constraint allows setting a higher number of antennas in each network in order to improve coverage and network access. As discussed above, FIGS. 2 and 3 illustrate how the problem characteristics influence the RSI values for a cell X.

For purposes of describing the disclosed embodiments, the following will be discussed in terms of a Multi-Parent Biased Random-Key Genetic Algorithm with Implicit Path-Relinking (BRKGA-MP-IPR), which is a multi-parent variant of the standard BRKGA. However, the disclosed embodiments are not limited to this implementation and other optimization frameworks (such as Iterated Local Search), which can operate in the unitary space, can be utilized.

Table 3 below indicates the parameters utilized for the following discussion.

TABLE 3

Parameters.

| | |
|---|---|
| p | Number of independent populations |
| $\mathcal{P}$ | Chromosome population |
| $\mathcal{P}_e$ | Elite individuals |
| $\mathcal{P}_m$ | Mutant individuals |
| $\pi_e$ | Number of elite parents in mating |
| $\pi_t$ | Number of total parents in mating |
| $\Phi(r)$ | Bias function for mating |
| typ | Path-relinking type |
| md | Minimal distance between chromosomes for IPR |
| sel | Individual selection for IPR |
| ps | Path percentag /size |
| g | Interval for inter-population migrations |
| $I_s$ | Number of iterations for shake calling |
| $R_m$ | Reset iteration multiplier |

The process begins by generating p populations of |𝒫| random individuals. Individuals are represented by chromosomes, whose genes are random-keys with real values between zero and one. Afterward, a warm-start solution, generated by a greedy heuristic, which will be described below, is introduced in the populations.

The individuals pass through the decoding process, obtaining their respective fitness value. These values are used to rank the individuals as elite set $\mathcal{P}_e$ or non-elite individuals.

At each generation, three different operators act to create a new population: reproduction, mutants generation, and crossover. Reproduction copies all elite individuals $\mathcal{P}_e$ in the elite set of the next generation, while mutants generation deletes the worst |$\mathcal{P}_m$| individuals and randomly generates the same number for the new population. The Crossover operator creates |𝒫|-|$\mathcal{P}_m$|-|$\mathcal{P}_e$| offspring chromosomes to fill the population.

In BRKGA-MP-IPR, multiple parents are selected for the crossover procedure. The process utilizes $\pi_e$ elite parents and $\pi_t$-$\pi_e$ parents from the non-elite set. The mating of the $\pi_t$ parents generates a new individual. As a criterion for selecting genes in mating, the process uses the bias function indicated as $\Phi(r)$, which considers the rank r of the selected parents. The steps of reproduction, mutants generation, and crossover procedures are repeated until a stopping criterion is met.

For intensification, the Implicit Path Relinking (IPR) procedure may be called. The path-relinking procedure explores the neighborhood obtained in the path between two good, distinct solutions. The BRKGA-MP-IPR framework introduces the implicit path-relinking, which creates the procedure inside the existing BRKGA solution space.

After path-relinking, it is possible to migrate elite individuals between different populations (if there is more than one population). This procedure occurs upon or after g generations without a betterment of the optimal solution. Similarly, if $I_s$ generations have passed without an improvement, then a shaking procedure, discussed in further detail below, may be called. Finally, if there are $I_s \cdot R_m$ generations without improvement, then a full reset of the populations is performed.

Three decoders are provided for this problem, each using a different strategy. These decoders use different ways of interpreting the chromosome, or even different chromosome characteristics, to obtain a possible coloring for the graph. All decoders presented herein permit illegal colorings, for example, colorings in which the minimum-maximum differences are not respected in one or more edges. These conflicting edges are penalized in the objective function by a factor C. However, a correction procedure is applied in the end, trying to solve these constraint violations, which will be discussed in further detail below.

Since there are two possible objectives, the decoders obtain the coloring cost separately through the procedure 600 (Procedure 1) depicted in FIG. 6. Lines 3-5 detail the procedure to identify the number of conflicting edges, by checking whether the maximum-minimum differences are not respected. Then, between lines 6-16, the procedure computes the coloring cost. In the first case, the number of changes in configuration is obtained by comparing the old and new RSI configuration of each vertex (lines 6-10). For the second case, the cost is computed with the minimum edge span in lines 12-16. Note that the minimum edge span should also be the value of a legally colored edge. After cost computation, two procedures may be performed: the correction procedure and the local search. These procedures are discussed in further detail below.

A Logic Direct decoder (LD) is named as such due to its use of logical variables for the relation between the values of the RSI of neighbor nodes. These Boolean variables indicate whether a vertex can or cannot be colored with a given RSI. This decoder interprets the chromosome as the order in which vertices are colored, being thus |V|-sized, with |V| indicating the number of vertices in the instance. A process 700 (Process 2) of FIG. 7 depicts such a strategy.

The decoder starts by assigning the old configuration to the first vertex in the non-increasing order. Such order is obtained from the chromosome by sorting the keys. A determination is made whether for all other vertices, the previous configuration is possible using a logical relation in Line 9. If it is not possible to color with the old color (Line 12), all possible colors are checked in increasing order in the loop of Line 16. If the vertex could not be colored with any of the possible RSI values, process 2 allocates the previous configuration for it.

A Simple Coloring Decoder also uses a |V|-sized chromosome, but instead of ordering the vertices, this decoder directly uses each gene's value. The possible RSI values are normalized so that each gene corresponds directly to an RSI, which is then allocated to its vertex. A process 800 (Process 3) of FIG. 8 depicts this decoder. This decoder has the characteristic of generating many infeasible solutions compared to its counterparts due to the strong random component in its generation.

Differing from the previous decoders, a Color Ordered by Degrees Decoder uses a k+1-sized chromosome, with k, indicating the number of possible colors. This decoder gives an ordering of colors. The vertices are ordered by decreasing values of degrees. Therefore, the process prioritizes to color vertices with the significant potential to create more conflicts (e.g., more difficult vertices to color) first. This process consists of the iterative coloring of non-adjacent vertices, whose degrees are non-increasing, with the same colors. FIG. 9 depicts a process 900 (e.g., Process 4) for the Color Ordered by Degrees Decoder (KD) decoder.

By following the colors and degrees order, the decoder checks each vertex to verify the color's feasibility as in the previous configuration (lines 4-13). Afterward, all still uncolored vertices have the other possible colors checked as possibilities, as shown in lines 14-23. If a vertex is still uncolored, it is assigned its previous or old configuration (lines 24-26).

A corrective procedure only occurs if there are conflicts (e.g., the coloring is illegal for a particular solution). This procedure interprets the chromosome as a tree-like structure. The procedure visits the adjacent nodes of all already visited vertices and changes the coloring of these neighbors if the edge has a conflict. All vertices are visited, and coming back to an already visited vertex is not allowed. The correction procedure ends when all vertices are visited. This procedure effectively finds feasible solutions from non-feasible ones, but it may still result in non-feasible solutions.

A local search procedure occurs at the end of every decoding and attempts to find better solutions in the 1-color exchange space. That is, the procedure searches better solutions that are obtained by changing the color of one vertex of the analyzed initial solution. The local search is based on either Best Improvement (BI) or First Improvement (FI) strategies. In addition, local search BI may be performed on only part of the solution space, defined by a percentile LS % of the available vertices in each instance.

On minimize-changes objective, the local search procedure changes the new color of a vertex to its old coloring and then recalculates the related coloring cost. If a vertex already has its old configuration, then the procedure skips it.

The maximize-minimum-edge-span objective has a different procedure. For each vertex, it identifies its smallest legal edge. Then, the adjacent vertex related to this edge has its color changed to the best available value, which is the one that increases the most the edge value without violating the maximum possible difference of the instance. In the case of the vertex having no legal edges, then it is skipped by the procedure.

As it relates to shaking and reset, the shaking procedure partially re-initializes the population so that the good genes originated from the algorithm convergence will not be lost, as it happens in a full resetting. This method involves the application of random modifications to elite chromosomes and the re-initialization of the non-elite ones. Thus, the structure of the elite chromosomes is partially preserved, and the diversity of the non-elite set is guaranteed. Meanwhile, the resetting procedure considers the case in which the shaking procedure does not manage to re-introduce adequate genetic diversity, (e.g., the process finds itself stuck on a local optimum for a high number of generations).

Since the shaking works directly in the chromosome structure, generic shakings do not perform well. Therefore, a shaking procedure is provided herein for decoders LD and KD (a process 1000 (e.g., Process 5) of FIG. 10), and another strategy for decoder SC (a process 1100 (e.g., Process 6) of FIG. 11).

Both reset and the shaking procedures are called if a given number of iterations has occurred without improving the best solution. The amount of iterations for reset is a multiple of the number of iterations until shaking. For example, shaking always occurs first and more frequently than reset.

For the RSI allocation problem, the warm start procedure colors the vertices with the smallest possible color, considering the minimum and maximum difference between the RSI of the vertices. This procedure colors the vertices in non-increasing degree order. For example, the vertices with higher degrees are colored first. Note that the solution generated by this procedure may be infeasible.

This procedure uses the initial coloration for both objectives. The initial coloration is more important for the minimize-changes objective, but it is also considered for the maximize-minimum-edge-span case.

Figure 12:
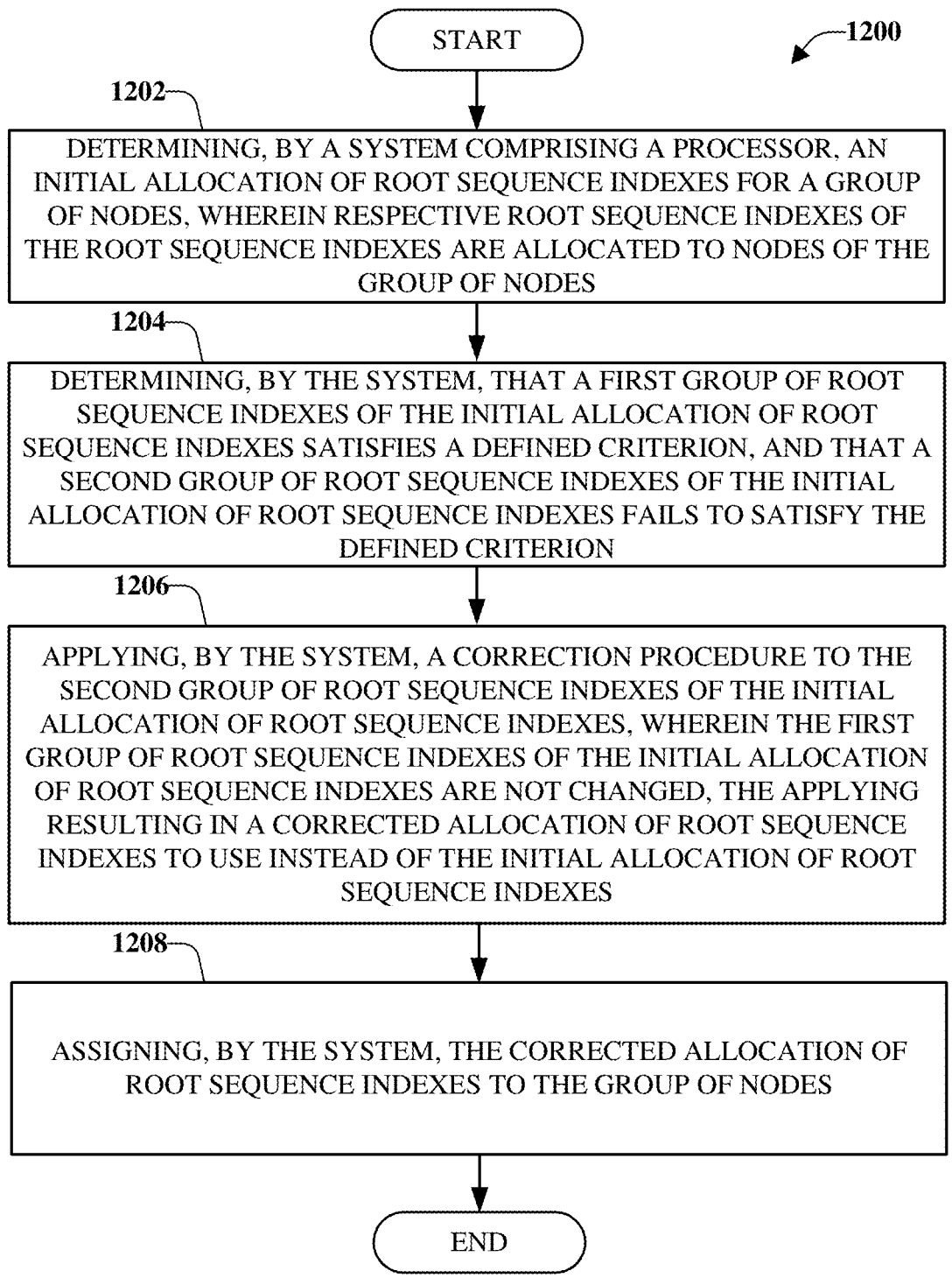
FIG. 12 illustrates an example, non-limiting, computer-implemented method for facilitating root sequence index assignments in accordance with one or more embodiments described herein.

FIG. 12 illustrates an example, non-limiting, computer-implemented method 1200 for facilitating RSI assignments in accordance with one or more embodiments described herein. The computer-implemented method 1200 can be implemented by a system including a memory and a processor, network equipment including a memory and a processor, a network controller including a memory and a processor, or another computer-implemented device including a memory and a processor.

The computer-implemented method 1200 starts at 1202 with a determination of an initial allocation of root sequence indexes for a group of nodes. Respective root sequence indexes of the root sequence indexes are allocated to nodes of the group of nodes.

In an example, determining the initial allocation can include obtaining, by the system, historical root sequence index assignments for the group of nodes. In another example, determining the initial allocation can include generating, by the system, root sequence index assignments randomly.

At 1204, it is determined that a first group of root sequence indexes of the initial allocation of root sequence indexes satisfies a defined criterion. It is also determined that a second group of root sequence indexes of the initial allocation of root sequence indexes fails to satisfy the defined criterion. In some implementations, the defined criterion is with respect to a defined number of changes. According to these implementations, the method includes retaining a number of changes associated with the initial allocation of root sequence indexes as a function of the defined number of changes. For example, the number of changes can be retained to be at or below the defined number of changes.

According to some implementations, the defined criterion is with respect to a defined distance. Further to these implementations, the method includes determining respective distances between allocations of duplicate root sequence indexes of the initial allocation of root sequence indexes. Further, the method includes, based on an analysis of the respective distances, assigning the duplicate root sequence indexes based on the respective nodes of the group of nodes being at least the defined distance from one another. In an example, the duplicate root sequence indexes are root sequence indexes reused by two nodes of the group of nodes.

A correction procedure is applied, at 1206, to the second group of root sequence indexes of the initial allocation of root sequence indexes. The first group of the initial allocation of root sequence indexes are not changed. Application of the correction procedure results in a corrected allocation of root sequence indexes. The corrected application procedure is used instead of the initial allocation of root sequence indexes.

In some implementations, applying the correction procedure can include projecting corrected solutions into a unitary hyperspace. The corrected solutions can be defined by respective vectors in the unitary hyperspace. Further to these implementations, the method can include combining, by the system, the corrected solutions in the unitary hyperspace.

Further, at 1208, the corrected allocation of root sequence indexes is assigned to the group of nodes. According to some implementations, a corrected allocation is not determined. For example, an infeasibility of an allocation of the second group of root sequence indexes of the initial allocation of root sequence indexes can be determined. In this case, based on the infeasibility, the corrected allocation of the root sequence indexes is discarded or not applied to the group of nodes.

Figure 13:
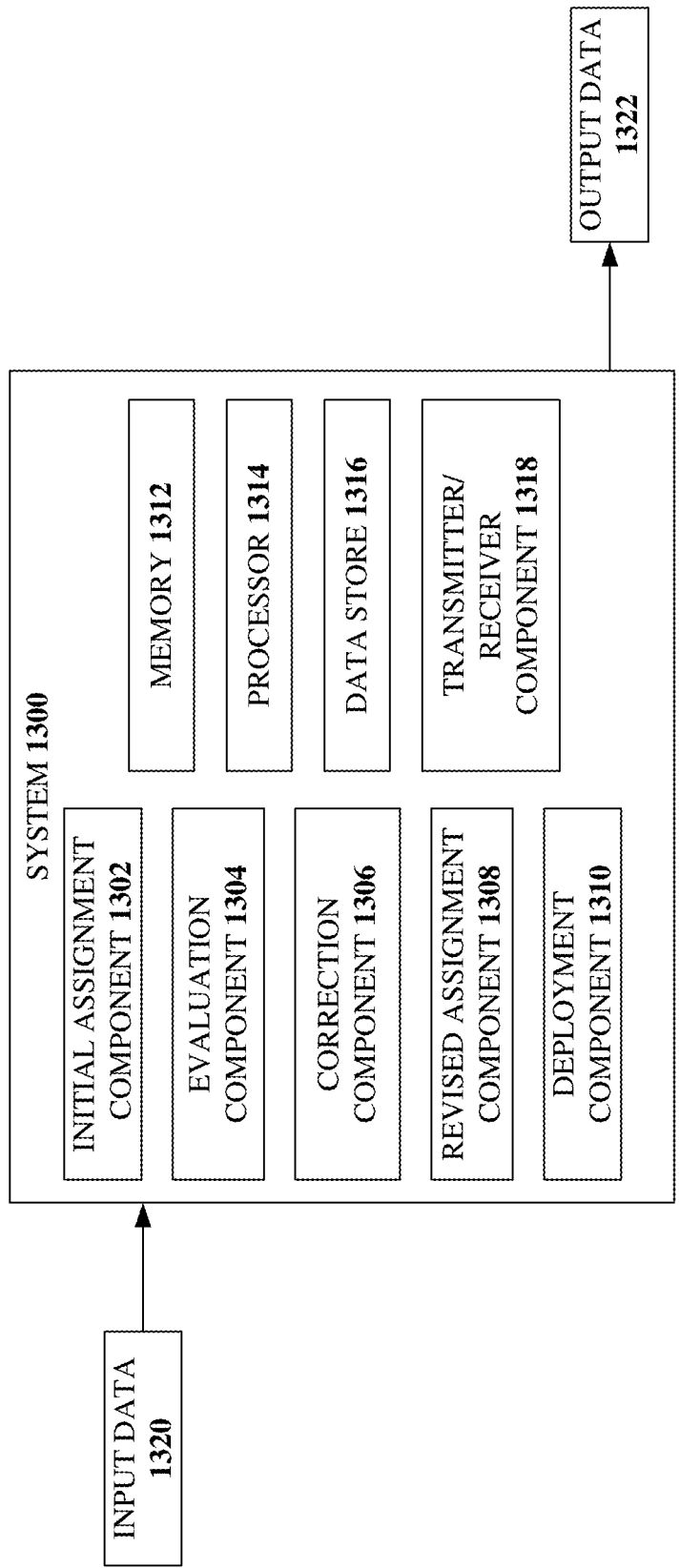
FIG. 13 illustrates an example, non-limiting, system that facilitates root sequence index assignment and deployment in accordance with one or more embodiments described herein.

FIG. 13 illustrates an example, non-limiting, system 1300 that facilitates RSI assignment and deployment in accordance with one or more embodiments described herein. Repetitive description of like elements employed in other embodiments described herein is omitted for sake of brevity. The system 1300 can be configured to perform functions associated with the system of FIG. 4, the system 500 of FIG. 5, the processes of FIGS. 6-11, the computer-implemented method 1200 of FIG. 12, other systems, other processes, and/or other computer-implemented methods discussed herein.

Aspects of systems (e.g., the system 1300 and the like), apparatuses, and/or processes (e.g., computer-implemented methods) explained in this disclosure can include machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described. In various embodiments, the system 1300 can be any type of component, machine, device, facility, apparatus, and/or instrument that can include a processor and/or can be capable of effective and/or operative communication with a wired and/or wireless network.

The system 1300 can include an initial assignment component 1302, an evaluation component 1304, a correction component 1306, a revised assignment component 1308, a deployment component 1310, at least one memory 1312, at least one processor 1314, at least one data store 1316, and a transmitter/receiver component 1318. In various embodiments, one or more of: the initial assignment component 1302, the evaluation component 1304, the correction component 1306, the revised assignment component 1308, the deployment component 1310, the at least one memory 1312, the at least one processor 1314, the at least one data store 1316, and the transmitter/receiver component 1318 can be electrically and/or communicatively coupled to one another to perform one or more of the functions of the system 1300. In some embodiments, one or more of: the initial assignment component 1302, the evaluation component 1304, the correction component 1306, the revised assignment component 1308, the deployment component 1310, and the transmitter/receiver component 1318 can include software instructions stored on the at least one memory 1312 and/or the at least one data store 1316 and executed by the at least one processor 1314. The system 1300 may also interact with other hardware and/or software components not depicted in FIG. 13.

The initial assignment component 1002 can determine an initial assignment of root sequence indexes for a group of network equipment. For example, the initial assignment component 1302 can receive, as input data 1320, data related to historical assignments that were deployed on the group of network equipment, on other network equipment, or on a combination of the group of network equipment and other network equipment. The historical assignments can be retained, for example, in the at least one data store 1316 and/or in another data store, which can be one or more data stores internal to the system 1300 and/or one or more data stores external to the system 1300. For example, the initial assignment component 1302 can receive historical root sequence index assignments for the group of network equipment. The historical root sequence index assignments comprise feasible assignments and non-feasible assignments, according to a feasibility criterion. According to another example, to determine the initial assignment, the initial assignment component 1302 can randomly generate root sequence assignments based on historical assignments and/or based on other data.

The evaluation component 1304 can evaluate the initial assignment, determined by the initial assignment component 1302. The evaluation can include determining that first assignments satisfy a defined criterion and that second assignments fail to satisfy the defined criterion. In an example, the defined criterion is an amount of root sequence index changes within a communications network. In another example, the defined criterion is evaluated relative to a distance between first network equipment and second network equipment that share a common root sequence index.

Based on the defined criterion, the correction component 1306 updates the second assignments, resulting in updated second assignments. For example, to update the respective assignments, the correction component 1306 can project corrected solutions into a unitary hyperspace. The corrected solutions can be defined by respective vectors in the unitary hyperspace. Further, the correction component 1306 can combine the corrected solutions in the unitary hyperspace.

In some cases, it might be determined that updated second assignments are not feasible and, therefore, the initial assignment of root sequence indexes can be discarded. Further, the initial assignment component 1302 can determine another initial assignment, different than the original initial assignment that was determined to be infeasible.

The revised assignment component 1308 can determine a revised assignment of root sequence indexes for the group of network equipment. The revised assignment includes the updated second assignments and the initial assignment for the first assignments, which did satisfy the defined criterion. Information indicative of the revised assignment can be output, as output data 1322.

Further, the deployment component 1310 can deploy the revised assignment of root sequence indexes at the group of network equipment. In some implementations, to facilitate the deployment of the revised assignment, the deployment component 1310 can apply batch processing to deploy the assignment in batches of network equipment. For example, the batches of network equipment can include a first batch of network equipment and at least a second batch of network equipment.

The application of the batch processing by the deployment component 1310 can be performed while mitigating and/or reducing an interdependency between the first batch of network equipment and at least the second batch of network equipment. For example, mitigating and/or reducing the interdependency includes ordering a deployment of the batches of network equipment based on minimizing potential issues and outages, making rollbacks possible in the cases of failures, and/or reducing and/or mitigating resources utilized.

With continuing reference to FIG. 13, the at least one memory 1312 can be operatively connected to the at least one processor 1314. The at least one memory 1312 and/or the at least one data store 1316 can store executable instructions that, when executed by the at least one processor 1314 can facilitate performance of operations. Further, the at least one processor 1314 can be utilized to execute computer executable components stored in the at least one memory 1312 and/or the at least one data store 1316.

For example, the at least one memory 1312 can store protocols associated with RSI assignment and deployment as discussed herein. Further, the at least one memory 1312 can facilitate action to control communication between the system 1300, other apparatuses, other systems, equipment, network equipment, and/or user equipment associated with the categories under consideration, and so on, such that the system 1300 can employ stored protocols and/or processes to facilitate load balancing of resources as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 1314 can facilitate respective assignment and deployment of RSI allocation as discussed herein. The at least one processor 1314 can be a processor dedicated to analyzing and/or generating information received, a processor that controls one or more components of the system 1300, and/or a processor that both analyzes and generates information received and controls one or more components of the system 1300.

Figure 14:
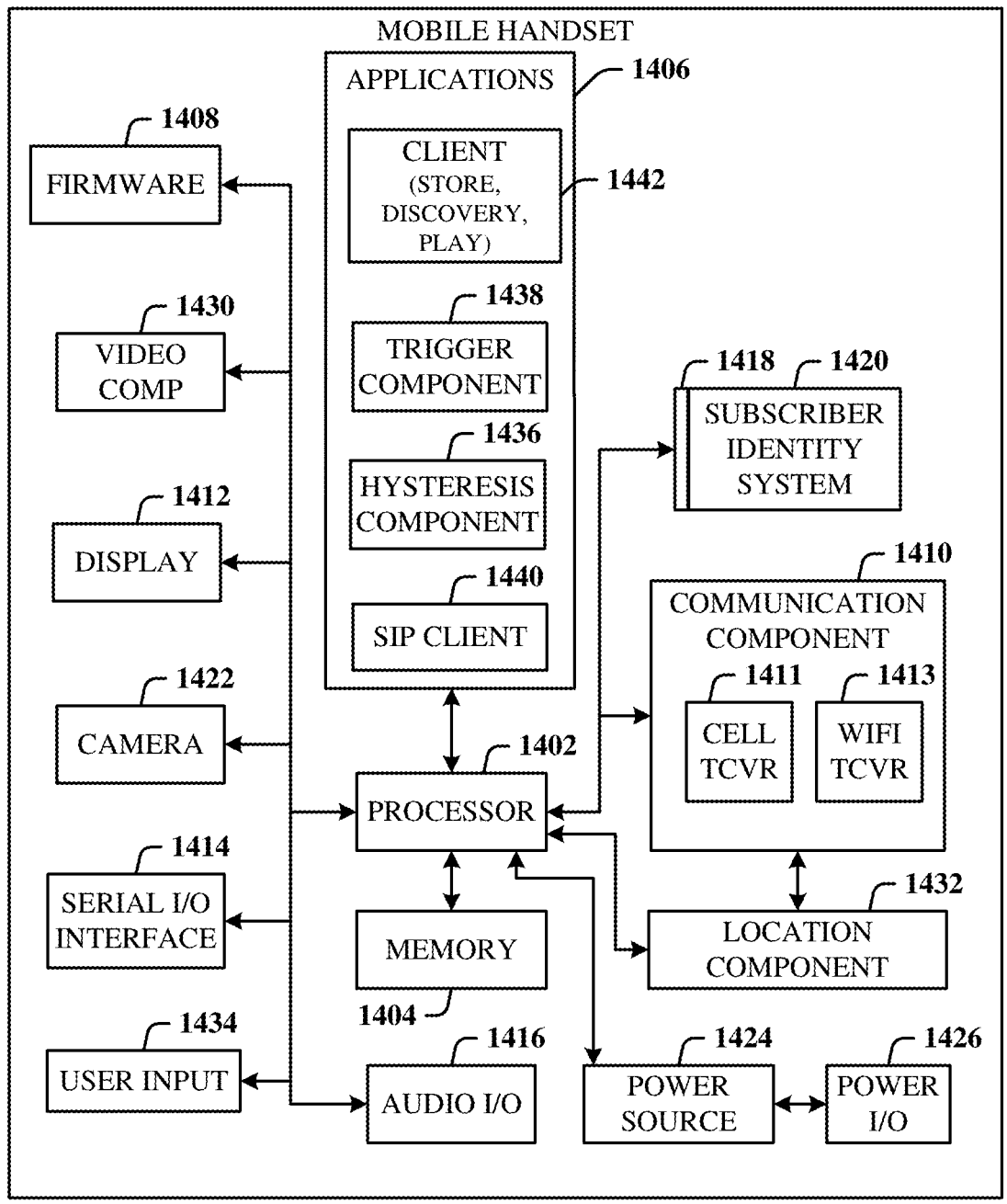
FIG. 14 illustrates an example, non-limiting, block diagram of a handset operable to engage in a system architecture that facilitates wireless communications according to one or more embodiments described herein.

Described herein are systems, methods, articles of manufacture, non-transitory machine-readable medium, and other embodiments or implementations that can facilitate assignment of root sequence index while minimizing network changes. Referring now to FIG. 14, illustrated is an example, non-limiting, block diagram of a handset 1400 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing, and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touchscreen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for a dual-mode GSM handset. The handset 1400 can accommodate at least satellite radio services through a handset that can combine wireless voice and digital radio chipsets into a single handheld device.

Figure 15:
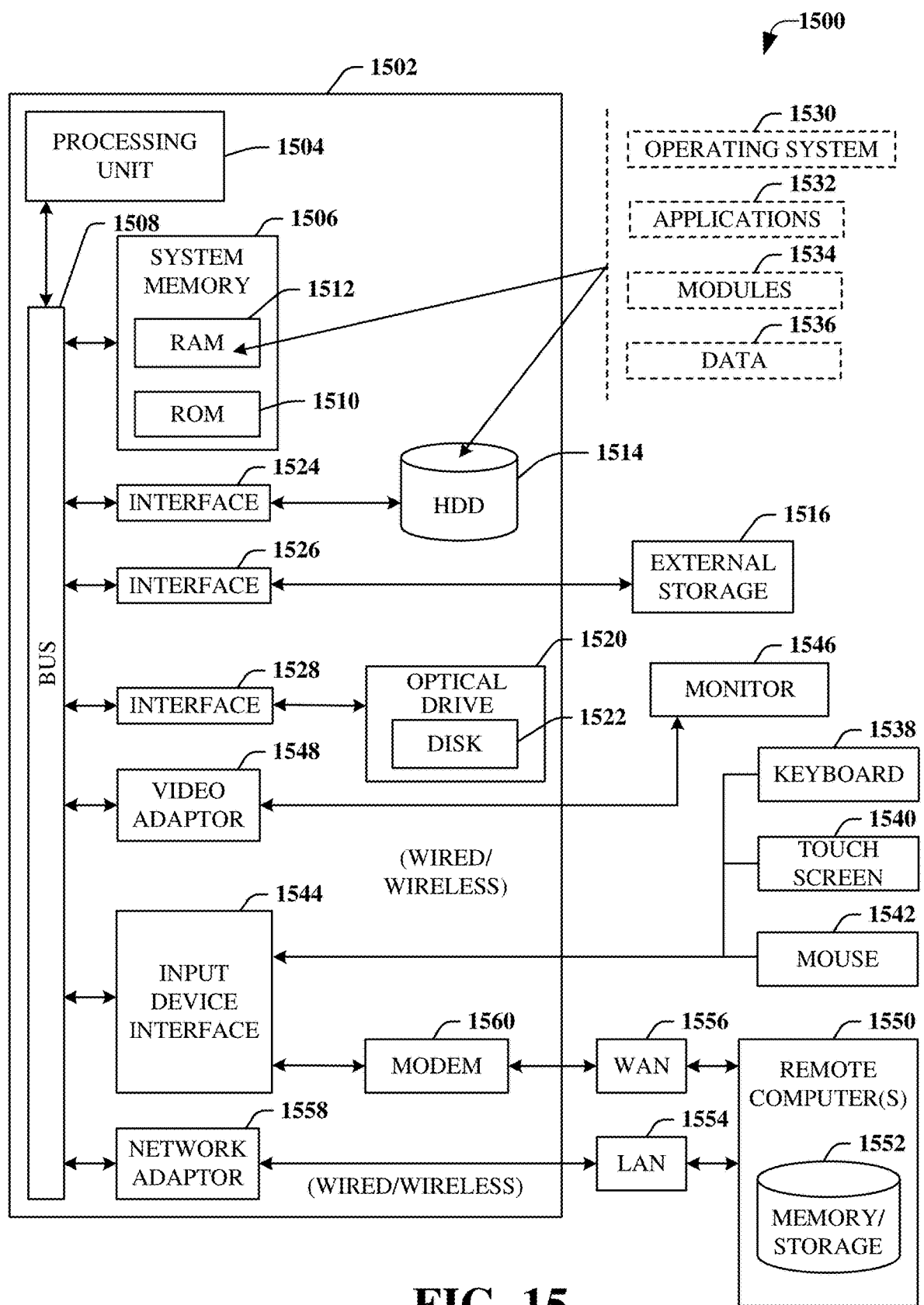
FIG. 15 illustrates an example, non-limiting, block diagram of a computer operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A Basic Input/Output System (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For example, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a system comprising a processor, an
       initial allocation of root sequence indexes for a group of nodes, wherein respective root sequence indexes of the root sequence indexes are allocated to nodes of the group of nodes;

determining, by the system, that a first group of root sequence indexes of the initial allocation of root sequence indexes satisfies a defined criterion, and that a second group of root sequence indexes of the initial allocation of root sequence indexes fails to satisfy the defined criterion;

applying, by the system, a correction procedure to the second group of root sequence indexes of the initial allocation of root sequence indexes, wherein the first group of root sequence indexes of the initial allocation of root sequence indexes are not changed, the applying resulting in a corrected allocation of root sequence indexes to use instead of the initial allocation of root sequence indexes; and assigning, by the system, the corrected allocation of root sequence indexes to the group of nodes.

2. The method of claim 1, wherein the defined criterion is with respect to a defined distance, and wherein the determining of the initial allocation comprises:

determining respective distances between allocations of duplicate root sequence indexes of the initial allocation of root sequence indexes; and based on an analysis of the respective distances, assigning the duplicate root sequence indexes based on the respective nodes of the group of nodes being at least the defined distance from one another.

3. The method of claim 2, wherein the duplicate root sequence indexes are root sequence indexes reused by two nodes of the group of nodes.

4. The method of claim 1, wherein the defined criterion is with respect to a defined number of changes, and wherein the determining of the initial allocation comprises:

retaining a number of changes associated with the initial allocation of root sequence indexes as a function of the defined number of changes.

5. The method of claim 1, wherein the applying comprises:

projecting corrected solutions into a unitary hyperspace, wherein the corrected solutions are defined by respective vectors in the unitary hyperspace.

6. The method of claim 5, further comprising:

combining, by the system, the corrected solutions in the unitary hyperspace.

7. The method of claim 1, further comprising:

prior to the assigning, determining, by the system, an infeasibility of an allocation of the second group of root sequence indexes of the initial allocation of root sequence indexes, and based on the infeasibility, discarding, by the system, the corrected allocation of root sequence indexes.

8. The method of claim 1, wherein the determining of the initial allocation comprises:

obtaining historical root sequence index assignments for the group of nodes.

9. The method of claim 1, wherein the determining of the initial allocation comprises:

generating root sequence index assignments randomly.

10. A system, comprising:

a processor; and a memory that stores executable instructions that, when executed by the processor, facilitate performance of operations, comprising:

determining an initial assignment of root sequence indexes for a group of network equipment;

evaluating the initial assignment for first assignments that satisfy a defined criterion and second assignments that fail to satisfy the defined criterion;

based on the defined criterion, updating the second assignments, resulting in updated second assignments; and determining a revised assignment of root sequence indexes for the group of network equipment, wherein the revised assignment comprises the first assignments and the updated second assignments.

11. The system of claim 10, wherein the operations further comprise:

based on the determining of the revised assignment, deploying the revised assignment of root sequence indexes at the group of network equipment.

12. The system of claim 10, wherein the defined criterion is an amount of root sequence index changes within a communications network.

13. The system of claim 10, wherein the defined criterion is evaluated relative to a distance between first network equipment and second network equipment that share a common root sequence index.

14. The system of claim 10, wherein the updating of the second assignments comprises:

determining that updates to the second assignments are not feasible; and discarding the initial assignment of root sequence indexes.

15. The system of claim 10, wherein the determining of the initial assignment comprises:

generating root sequence assignments based on historical assignments.

16. The system of claim 10, wherein the determining of the initial assignment comprises:

receiving historical root sequence index assignments for the group of network equipment, wherein the historical root sequence index assignments comprise feasible assignments and non-feasible assignments, according to a feasibility criterion.

17. The system of claim 10, wherein the updating comprises:

projecting corrected solutions into a unitary hyperspace, wherein the corrected solutions are defined by respective vectors in the unitary hyperspace; and combining the corrected solutions in the unitary hyperspace.

18. A non-transitory machine-readable medium, comprising executable instructions that, when executed by a processor, facilitate performance of operations, comprising:

evaluating an assignment of root sequence indexes to network equipment, wherein the evaluating comprises:

determining first root sequence indexes of the assignment of root sequence indexes that satisfy a defined criterion, and determining second root sequence indexes of the assignment of root sequence indexes that fail to satisfy the defined criterion;

modifying the assignment of root sequence indexes comprising modifying assignments of the second root sequence indexes, wherein assignments of the first root sequence indexes are not modified, the modifying resulting in a modified assignment of root sequence indexes; and deploying the modified assignment of root sequence indexes at the network equipment.

19. The non-transitory machine-readable medium of claim 18, wherein the defined criterion is an amount of root sequence index changes within a communications network.

20. The non-transitory machine-readable medium of claim 18, wherein the defined criterion is based on a distance between first network equipment and second network equipment that share a common root sequence index.

* * * * *